(12) United States Patent
Ramaswamy et al.

(10) Patent No.: US 11,716,286 B2
(45) Date of Patent: *Aug. 1, 2023

(54) COLLECTING AND ANALYZING DATA REGARDING FLOWS ASSOCIATED WITH DPI PARAMETERS

(71) Applicant: VMware, Inc., Palo Alto, CA (US)

(72) Inventors: Navaneeth Krishnan Ramaswamy, Chennai (IN); Ganesh Srinivasan, Chennai (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,784

(22) Filed: Oct. 29, 2022

(65) Prior Publication Data

US 2023/0054961 A1 Feb. 23, 2023

Related U.S. Application Data

(63) Continuation of application No. 16/792,908, filed on Feb. 18, 2020, now Pat. No. 11,489,783.

(30) Foreign Application Priority Data

Dec. 12, 2019 (IN) .............................. 201941051486

(51) Int. Cl.
*H04L 47/36* (2022.01)
*H04L 43/026* (2022.01)
(Continued)

(52) U.S. Cl.
CPC ............ *H04L 47/36* (2013.01); *H04L 43/026* (2013.01); *H04L 45/38* (2013.01); *H04L 47/22* (2013.01)

(58) Field of Classification Search
CPC ........ H04L 47/36; H04L 47/22; H04L 43/026; H04L 45/38
(Continued)

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1926809 A 3/2007
CN 102577270 A 7/2012
(Continued)

OTHER PUBLICATIONS

Q4-11-DOC1(190410), "Modification of Q.SD-WAN" (Year: 2019).*
(Continued)

*Primary Examiner* — Intekhaab A Siddiquee
(74) *Attorney, Agent, or Firm* — Adeli LLP

(57) ABSTRACT

Some embodiments provide a method for performing deep packet inspection (DPI) for an SD-WAN (software defined, wide area network) established for an entity by a plurality of edge nodes and a set of one or more cloud gateways. At a particular edge node, the method uses local and remote deep packet inspectors to perform DPI for a packet flow. Specifically, the method initially uses the local deep packet inspector to perform a first DPI operation on a set of packets of a first packet flow to generate a set of DPI parameters for the first packet flow. The method then forwards a copy of the set of packets to the remote deep packet inspector to perform a second DPI operation to generate a second set of DPI parameters. In some embodiments, the remote deep packet inspector is accessible by a controller cluster that configures the edge nodes and the gateways. In some such embodiments, the method forwards the copy of the set of packets to
(Continued)

the controller cluster, which then uses the remote deep packet inspector to perform the remote DPI operation. The method receives the result of the second DPI operation, and when the generated first and second DPI parameters are different, generates a record regarding the difference.

20 Claims, 10 Drawing Sheets

(51) Int. Cl.
    *H04L 45/00*     (2022.01)
    *H04L 47/22*     (2022.01)

(58) Field of Classification Search
    USPC .......................................................... 370/235
    See application file for complete search history.

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchai et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |

(56) References Cited

U.S. PATENT DOCUMENTS

| | | |
|---|---|---|
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | Ei-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,666,497 B2 | 5/2020 | Fahhan et al. |
| 10,686,625 B2 | 6/2020 | Cidon et al. |
| 10,693,739 B1 | 6/2020 | Naseri et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,533,248 B2 | 12/2022 | Mayya et al. |
| 11,575,591 B2 | 2/2023 | Ramaswamy et al. |
| 11,575,600 B2 | 2/2023 | Markuze et al. |
| 11,582,144 B2 | 2/2023 | Ramaswamy et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Kiessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |

(56) References Cited

U.S. PATENT DOCUMENTS

| | | |
|---|---|---|
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |

(56) References Cited

U.S. PATENT DOCUMENTS

| | | |
|---|---|---|
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155590 A1 | 6/2017 | Dillon et al. |
| 2017/0163473 A1 | 6/2017 | Sadana et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |

(56) References Cited

U.S. PATENT DOCUMENTS

| | | |
|---|---|---|
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Fumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0306282 A1 | 10/2019 | Masputra et al. |
| 2019/0313907 A1 | 10/2019 | Khachaturian et al. |
| 2019/0319847 A1 | 10/2019 | Nahar et al. |
| 2019/0327109 A1 | 10/2019 | Guichard et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |

(56) References Cited

U.S. PATENT DOCUMENTS

| | | |
|---|---|---|
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Vallur et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0166713 A1 | 5/2022 | Markuze et al. |
| 2022/0210041 A1 | 6/2022 | Gandhi et al. |
| 2022/0210042 A1 | 6/2022 | Gandhi et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |

FOREIGN PATENT DOCUMENTS

| | | |
|---|---|---|
| CN | 102811165 A | 12/2012 |
| CN | 104956329 A | 9/2015 |

(56) References Cited

FOREIGN PATENT DOCUMENTS

| | | |
|---|---|---|
| CN | 106230650 A | 12/2016 |
| CN | 106656847 A | 5/2017 |
| CN | 110447209 A | 11/2019 |
| CN | 111198764 A | 5/2020 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| EP | 3991359 A1 | 5/2022 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |
| RU | 2574350 C2 | 2/2016 |
| WO | 03073701 A1 | 9/2003 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |
| WO | 2022154850 A1 | 7/2022 |
| WO | 2022159156 A1 | 7/2022 |
| WO | 2022231668 A1 | 11/2022 |
| WO | 2022235303 A1 | 11/2022 |
| WO | 2022265681 A1 | 12/2022 |
| WO | 2023009159 A1 | 2/2023 |

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Guo, Xiangyi, et al., (U.S. Appl. No. 62/925,193) filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 17/943,147, filed Sep. 12, 2022, 42 pages, Nicira, Inc.

Non-Published Commonly Owned U.S. Appl. No. 15/803,964, filed Nov. 6, 2017, 15 pages, The Mode Group.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

PCT International Search Report and Written Opinion of Commonly Owned International Patent Application PCT/US2020/058883, dated Feb. 18, 2021, 12 pages, International Searching Authority (EPO).

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

(56) References Cited

OTHER PUBLICATIONS

Sarhan, Soliman Abd Elmonsef, et al., "Data Inspection in SDN Network," 2018 13th International Conference an Computer Engineering and Systems (ICCES), Dec. 18-19, 2018, 6 pages, IEEE, Cairo, Egypt.

Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IFFF, Toronto, ON, Canada.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

Non-Published Commonly Owned U.S. Appl. No. 18/083,536, filed Dec. 18, 2022, 27 pages, VMware, Inc.

Non-Published Commonly Owned U.S. Appl. No. 18/102,685, filed Jan. 28, 2023, 124 pages, VMware, Inc.

Non-Published Commonly Owned U.S. Appl. No. 18/102,687, filed Jan. 28, 2023, 172 pages, VMware, Inc.

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php? process=download&id=127&code=89d30565cd2ce087d3f8e95f9ad683066510a61f.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

\* cited by examiner

COLLECTING AND ANALYZING DATA REGARDING FLOWS ASSOCIATED WITH DPI PARAMETERS

CLAIM OF BENEFIT TO PRIOR APPLICATIONS

This application is a continuation of U.S. patent application Ser. No. 16/792,908, filed Feb. 18, 2020, now published as U.S. Patent Publication 2021/0184983. U.S. patent application Ser. No. 16/792,908 claims the benefit of Indian Patent Application No. 201941051486, filed Dec. 12, 2019. U.S. patent application Ser. No. 16/792,908, now published as U.S. Patent Publication 2021/0184983, and Indian Patent Application No. 201941051486 are incorporated herein by reference.

In recent years, several companies have brought to market solutions for deploying software defined (SD) wide-area networks (WANs) for enterprises. Some such SD-WAN solutions use external third-party private or public cloud datacenters (clouds) to define different virtual WANs for different enterprises. These solutions typically have edge forwarding elements (called edge devices) at edge nodes of an enterprise that connect with one or more gateway forwarding elements (called gateway devices or gateways) that are deployed in the third-party clouds.

In such a deployment, an edge device connects through one or more secure connections with a gateway, with these connections traversing one or more network links that connect the edge device with an external network. Examples of such network links include MPLS links, 5G LTE links, commercial broadband Internet links (e.g., cable modem links or fiber optic links), etc. The edge nodes include branch offices (called branches) of the enterprise, and these offices are often spread across geographies with network links to the gateways of various different network connectivity types. These SD-WAN solutions employ deep packet inspection to inform some of the operations that they perform.

BRIEF SUMMARY

Some embodiments provide a method for performing deep packet inspection (DPI) for an SD-WAN (software defined, wide area network) established for an entity by a plurality of edge nodes and a set of one or more cloud gateways. At a particular edge node, the method uses local and remote deep packet inspectors to perform DPI for a packet flow. Specifically, the method initially uses the local deep packet inspector to perform a first DPI operation on a set of packets of a first packet flow to generate a set of DPI parameters for the first packet flow.

The method then forwards a copy of the set of packets to the remote deep packet inspector to perform a second DPI operation to generate a second set of DPI parameters. In some embodiments, the remote deep packet inspector is accessible by a controller cluster that configures the edge nodes and the gateways. In some such embodiments, the method forwards the copy of the set of packets to the controller cluster, which then uses the remote deep packet inspector to perform the remote DPI operation. The method receives the result of the second DPI operation, and when the generated first and second DPI parameters are different, generates a record regarding the difference.

In some embodiments, the method uses the generated record to improve the local deep packet inspector's operation. For instance, in some embodiments, the local deep packet inspector is a third-party inspector that is used by the particular edge node, and the generated record is used to identify different flows for which the third-party inspector has poor DPI performance. When the generated record specifies a discrepancy between the first and second sets of generated DPI parameters, the method in some embodiments sends data regarding the discrepancy to a remote machine to aggregate with other data regarding other discrepancies in the DPI operations performed for other packet flows through the WAN.

In some embodiments, the method specifies a generated first set of DPI parameters as the set of DPI parameters associated with the first packet flow, after the first DPI operation is completed. When the first and second DPI parameter sets are different, the method in some embodiments modifies the set of DPI parameters associated with the first packet flow based on the generated second set of DPI parameters. For instance, in some embodiments, the method modifies the set of DPI parameters by storing the second set of DPI parameters as the set of DPI parameters associated with the first packet flow.

In some embodiments, the method forwards each packet to its destination after the local deep packet inspector has processed the packet. In other embodiments, however, the method delays the forwarding of packets of the first flow to the destination of the flow while performing the first DPI operation. During this time, the method stores the delayed packets in a storage queue of the particular edge node. Once the first DPI operation has been completed, the method forwards the set of packets stored in the storage queue as well as subsequent packets of the first flow to the destination. It also then forwards a copy of the set of packets to the remote deep packet inspector.

In some embodiments, the method forwards the packets of the first packet flow based on the generated first set of DPI parameters. For example, in some embodiments, the method uses at least one parameter in the generated first set of DPI parameters to select a path through the WAN to forward the packets of the first packet flow. When the generated first and second sets of DPI parameters are different, the method in some embodiments modifies the forwarding of the packets of the first packet flow, by using the second set of DPI parameters to forward (e.g., to select a path for) the packets of the first packet flow.

In some embodiments, the method forwards, from the particular edge node, at least a subset of the generated DPI parameters to other edge nodes directly or indirectly through the controller set. Also, in some embodiments, the method forwards, from the particular edge node, at least a subset of the generated DPI parameters to at least one gateway, again directly or indirectly through the controller set. In some embodiments, a generated DPI parameter set includes an identifier that identifies a type of traffic carried in payloads of the packets.

In these or other embodiments, a generated DPI parameter set includes an identifier that identifies an application that is a source of the first packet flow and/or an identifier that identifies a class of application to which this source belongs. In some embodiments, the remote or local deep packet inspector does not generate an identifier for the source application or class. In these embodiments, the edge node or controller cluster generates one or both of these identifiers by mapping the traffic type identifier produced by the DPI operations to the application or class identifiers.

The particular edge node in some embodiments is an edge machine (e.g., virtual machine (VM), container, standalone appliance, a program executing on a computer, etc.) that operates at an office (e.g., branch office) or datacenter of an entity with several computers, and this edge node connects the computers to the WAN. In some of these embodiments, the local deep packet inspector operates (e.g., as a VM or container) on a first computing device along with the edge node machine, while the remote deep packet inspector operates on a separate, second computing device in a remote location (e.g., in a different building, neighborhood, city, state, etc. than the location at which the particular edge node operates). In some embodiments, the first and second computing devices are computers, while in other embodiments, they are standalone DPI appliances. Still in other embodiments, the first computing device is an appliance, while the second computing device is a computer on which the remote deep packet inspector executes.

Some embodiments provide a method that uses DPI-generated parameters to assess, and in some cases to modify, how flows associated with particular applications traverse an SD-WAN that is defined by several edge nodes and one or more cloud gateways. At a set of one or more servers, the method receives sets of DPI parameters collected for packet flows processed by a first set of two or more edge nodes for which DPI operations were performed. From these collected sets, the method identifies a subset of DPI parameters associated with a plurality of flows relating to a particular application identifier specified by the DPI operations.

The received DPI parameters sets in some embodiments include operational statistics and metrics (e.g., packet transmission time, payload size, current number of packets processed by the node, etc.) relating to the packet flows processed by the first-set edge nodes. The statistics in some embodiments are accompanied by other data such as the flow identifiers, application classification details and forwarding decisions (e.g., identifying selected paths), etc. In some embodiments, the operational statistics, metrics and other data are collected and provided by the edge nodes and/or the gateways. The method then analyzes the identified subset of parameters to determine whether any packet flow associated with one or more particular DPI parameters had an undesirable metric relating to its flow through the WAN.

When this analysis produces a decision that the edge nodes should use different paths for the flows associated with the particular application identifier, the method then distributes adjusted next-hop forwarding records to a second set of one or more edge nodes to modify the paths that the edge nodes use to forward flows associated with the particular application identifier. In some embodiments, the first and second set of edge nodes are identical, while in other embodiments the first set of edge nodes is a subset of the second set of edge nodes (e.g., the second set includes at least one node not in the first edge).

In some embodiments, the DPI operations for a flow are performed at the source edge node (also called ingress edge node) where the flow enters the WAN and from where it is passed to another edge node or to a cloud gateway. Conjunctively with the DPI operations, the source edge node collects operational metrics and statistics (e.g., packet transmission time, payload size, current number of packets processed by the node, etc.) for the packets of the flow that it passes to another edge node or a cloud gateway, and provides the DPI generated parameters along with the collected statistics to the server set for its analysis.

In some embodiments, the source edge node collects statistics for a flow based on a number of initial packets that it uses to perform its DPI operations. The source edge node in some of these embodiments provides to the server set the initial set of packets that it uses for its DPI operations for a flow, along with the operational metrics and statistics that it provides to the server set for a new flow. In some embodiments, the number of packets in the initial packet set that is analyzed by the source edge node's DPI operation is dependent on the application that is being identified as the source of the flow by the DPI operations. Accordingly, the DPI operations analyze different number of packets for different flows that are from different applications or different types of applications.

The destination edge nodes (also called egress edge nodes) in some embodiments also perform DPI operations and collect operational metrics/statistics for the flows at the start of flows that they received through the WAN (i.e., from cloud gateways or other edge nodes). In other embodiments, the destination edge nodes do not perform DPI operations, but collect operational metrics/statistics for the flows at the start of flows. In some embodiments, the destination edge nodes receive (e.g., in-band with the packets through tunnel headers, or out-of-band through other packets) one or more DPI parameters (e.g., application identifiers) generated by the source edge node's DPI operation.

Conjunctively or alternatively to performing DPI operations at the edge nodes, some embodiments perform DPI operations outside of the edge nodes (e.g., at physical locations that are remote form physical locations at which the edge nodes operate). In some embodiments, the method also collects statistics/metrics from the gateways regarding the processing of the flows. In some embodiments, the source edge nodes set flags in the tunnel encapsulation headers that they use to forward packets to the gateways, in order to direct the gateways to collect statistics for certain flows.

In some embodiments, the server set uses the flow identifiers (e.g., five tuple identifiers of the flows) to correlate the metrics/statistics that it collects from the different forwarding elements of the SD-WAN (e.g., from the source edge nodes, destination edge nodes and/or the gateways). Once the collected metrics/statistics are correlated for a particular flow, the server set then analyzes the collected metrics/statistics to derive additional operational data that quantifies whether the particular flow is getting the desired level of service. The correlated metric/statistic data in some embodiments are associated with specific DPI generated parameters (e.g., application identifier, etc.) so that the analysis can be done on the DPI-parameter basis. For instance, the derived data in some embodiments is used to ascertain whether a particular flow associated with a particular application identifier reaches its destination within desired duration of time, whether the particular flow was delayed too much at a particular gateway, etc.

When the derived data demonstrates that the particular flow is not getting the desired level of service (e.g., a flow associated with a particular application identifier is not reaching its destination fast enough), the server set then distributes to the edge nodes and/or gateways adjusted next hop forwarding records that direct the edge nodes and/or gateways to modify the forwarding of the particular flow, or similar future flows (e.g., flows from with the same DPI identified application and/or to the same destination). For instance, based on the distributed new hop forwarding record, the source edge node selects a different gateway to forward the packets of the particular flow and other similar subsequent flows in some embodiments. In other embodiments, the source edge node uses the adjusted next hop forwarding record to select the gateway(s) to use for forwarding subsequent flows that are similar to the particular flow (e.g., flows with the same DPI identified application and to the same destination).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for performing deep packet inspection (DPI) for an SD-WAN (software defined, wide area network) established for an entity by a plurality of edge nodes and a set of one or more cloud gateways. At a particular edge node, the method uses local and remote deep packet inspectors to perform DPI for a packet flow. Specifically, the method initially uses the local deep packet inspector to perform a first DPI operation on a set of packets of a first packet flow to generate a set of DPI parameters for the first packet flow.

The method then forwards a copy of the set of packets to the remote deep packet inspector to perform a second DPI operation to generate a second set of DPI parameters. In some embodiments, the remote deep packet inspector is accessible by a controller cluster that configures the edge nodes and the gateways. In some such embodiments, the method forwards the copy of the set of packets to the controller cluster, which then uses the remote deep packet inspector to perform the remote DPI operation. The method receives the result of the second DPI operation, and when the generated first and second DPI parameters are different, generates a record regarding the difference.

In some embodiments, the method uses the generated record to improve the local deep packet inspector's operation. For instance, in some embodiments, the local deep packet inspector is a third-party inspector that is used by the particular edge node, and the generated record is used to identify different flows for which the third-party inspector has poor DPI performance. When the generated record specifies a discrepancy between the first and second sets of generated DPI parameters, the method in some embodiments sends data regarding the discrepancy to a remote machine to aggregate with other data regarding other discrepancies in the DPI operations performed for other packet flows through the WAN.

In some embodiments, the method specifies a generated first set of DPI parameters as the set of DPI parameters associated with the first packet flow, after the first DPI operation is completed. When the first and second DPI parameter sets are different, the method in some embodiments modifies the set of DPI parameters associated with the first packet flow based on the generated second set of DPI parameters. For instance, in some embodiments, the method modifies the set of DPI parameters by storing the second set of DPI parameters as the set of DPI parameters associated with the first packet flow.

Figure 1:
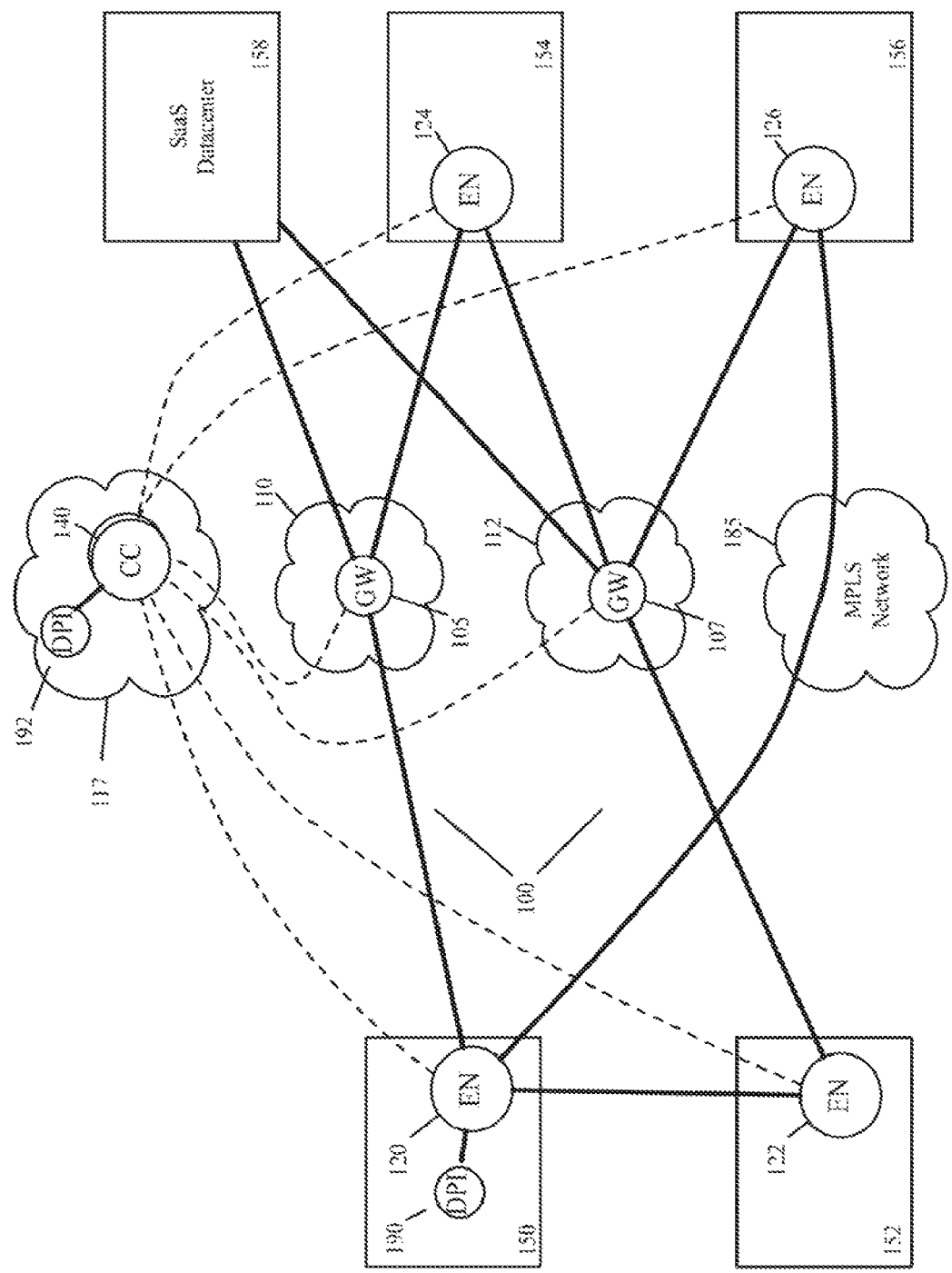
FIG. 1 illustrates an example of an edge node of an SD-WAN network using local and remote deep packet inspectors to perform a robust set of DPI operations.

FIG. 1 illustrates an example of an edge node of an SD-WAN network (also called a virtual network below) using local and remote deep packet inspectors to perform a robust set of DPI operations. In this example, the edge node 120 is the edge node that uses local and remote deep packet inspectors 190 and 192, while the SD-WAN is an SD-WAN 100 that is created for a particular entity to connect two branch offices 150 and 152 of the entity to two of its datacenters 154 and 156, as well as a datacenter 158 of a SaaS (Software as a Service) provider used by the entity. The SD-WAN 100 is established by a controller cluster 140, two cloud gateways 105 and 107, and four edge nodes 120-126, one in each of the branch offices and the datacenters 154 and 156.

The edge nodes in some embodiments are edge machines (e.g., virtual machines (VMs), containers, programs executing on computers, etc.) and/or standalone appliances that operate at multi-computer location of the particular entity (e.g., at an office or datacenter of the entity) to connect the computers at their respective locations to the cloud gateways and other edge nodes (if so configured). Also, in this example, the two gateways 105 and 107 are deployed as machines (e.g., VMs or containers) in two different public cloud datacenters 110 and 112 of two different public cloud providers.

An example of an entity for which such a virtual network can be established include a business entity (e.g., a corporation), a non-profit entity (e.g., a hospital, a research organization, etc.), and an educational entity (e.g., a university, a college, etc.), or any other type of entity. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In other embodiments, the gateways can also be deployed in private cloud datacenters of a virtual WAN provider that hosts gateways to establish SD-WANs for different entities.

In FIG. 1, the gateways are multi-tenant forwarding elements that can be used to establish secure connection links (e.g., tunnels) with edge nodes at the particular entity's multi-computer sites, such as branch offices, datacenters, etc. These multi-computer sites are often at different physical locations (e.g., different buildings, different cities, different states, etc.) and are also referred to below as multi-machine compute nodes. In FIG. 1, the edge nodes 120-126 comprise forwarding elements that exchange data messages with one or more gateways or other edge node forwarding elements through one or more secure connection links. In this example, only edge nodes 120 and 122 have a secure connection link between them. All other secure connection links of the edge nodes are with gateways.

In some embodiments, multiple secure connection links (e.g., multiple secure tunnels) can be established between an edge node and a gateway. When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, a wireless cellular link (e.g., a 5G LTE network), etc.

Also, multiple paths can be defined between a pair of edge nodes. FIG. 1 two examples of this. It illustrates two paths through gateways 105 and 107 between edge nodes 120 and 124. It also illustrates two paths between edge nodes 120 and 126, with one path traversing through the cloud gateway 107, and the other path traversing the an MPLS (multiprotocol label switching) network 185 of an MPLS provider to which both edge nodes 120 and 126 connect. FIG. 1 also illustrates that through the cloud gateways 105 and 107, the SD-WAN 100 allows the edge nodes to connect to the datacenter 158 of the SaaS provider.

In some embodiments, each secure connection link between a gateway and an edge node is formed as a VPN (virtual private network) tunnel between the gateway and an edge node. The gateways also connect to the SaaS datacenter 158 through secure VPN tunnels in some embodiments. The collection of the edge nodes, gateways and the secure connections between the edge nodes, gateways and SaaS datacenters forms the SD-WAN 100 for the particular entity. In this example, the SD-WAN spans two public cloud datacenters 110 and 112 and an MPLS network to connect the branch offices 150 and 152 and datacenters 154, 156 and 158.

In some embodiments, secure connection links are defined between gateways to allow paths through the virtual network to traverse from one public cloud datacenter to another, while no such links are defined in other embodiments. Also, as the gateways 105 and 107 are multi-tenant gateways, they are used in some embodiments to define other virtual networks for other entities (e.g., other companies, organizations, etc.). Some such embodiments store tenant identifiers in tunnel headers that encapsulate the packets that are to traverse the tunnels that are defined between a gateway and edge forwarding elements of a particular entity. The tunnel identifiers allow the gateway to differentiate packet flows that it receives from edge forwarding elements of one entity from packet flows that it receives along other tunnels of other entities. In other embodiments, the gateways are single tenant and are specifically deployed to be used by just one entity.

FIG. 1 illustrates a cluster of controllers 140 in the private datacenter 117. The controller cluster 140 serves as a central point for managing (e.g., defining and modifying) configuration data that is provided to the edge nodes and/or gateways to configure some or all of the operations. In some embodiments, the controller cluster has a set of manager servers that define and modify the configure data, and a set of controller servers that distribute the configuration data to the edge forwarding elements and/or gateways in some embodiments. In other embodiments, the controller cluster only has one set of servers that define, modify and distribute the configuration data. In some embodiments, the controller cluster directs edge nodes to use certain gateways (i.e., assigns gateway to the edge nodes), and to establish direct connections with other edge nodes.

Although FIG. 1 illustrates the controller cluster 140 residing in one private datacenter 117, the controllers in some embodiments reside in one or more public cloud datacenters and/or private cloud datacenters. Also, some embodiments deploy one or more gateways in one or more private datacenters (e.g., datacenters of the entity that deploys the gateways and provides the controllers for configuring the gateways to implement virtual networks).

In the example illustrated in FIG. 1, the deep packet inspectors 190 and 192 that are used by the edge node 120 are in two different physical locations. The local deep packet inspector 190 is at the same physical location with the edge node 120 (i.e., is in the branch 150), while the remote deep packet inspector 192 is co-located with the controller set 140 in the datacenter 117. In some embodiments, the local deep packet inspector operates (e.g., as a VM or container) on a first computing device along with the edge node machine. In other embodiments, the local deep packet inspector operates on separate device than the edge node machine or appliance. For instance, in these embodiments, the local deep packet inspector 190 is a standalone appliance or is a machine (e.g., VM or container) that executes on a separate computer.

The remote deep packet inspector 192 operates in a remote location (e.g., in a different building, neighborhood, city, state, etc. than the location at which the particular edge node operates) from the physical location of the edge node 120. In some embodiments, the remote deep packet inspector 192 is part of the controller cluster (e.g., is a separate process or thread executed by the controller cluster). In other embodiments, the remote packet inspector 192 operates in close proximity to controller cluster (e.g., is a VM executing in the same cluster of computers as the controller cluster and has a stable communication link with the controller cluster). Also, in some embodiments, the local and remote deep packet inspectors are executed by in specialized hardware accelerators that are part of CPUs, exist as one or more co-processors, exist as one or more add-on cards, and/or leverage specialized processing units (such as one or more GPUs).

For a particular packet flow, the edge node 120 initially uses the local deep packet inspector 190 to perform a first DPI operation on an initial set of packets of the particular packet flow. For the particular packet flow, the DPI operation generates a set of DPI parameters, which in different embodiments includes different DPI parameters or combination of such parameters, such as an identifier that specifies a type of traffic carried in payloads of the packets, an identifier that specifies an application that is a source of the flow, an identifier that specifies a class type associated with the flow, etc. In some embodiments, the local deep packet inspector does not generate an identifier for the source application or class. In these embodiments, the edge node generates one or both of these identifiers by mapping the traffic type identifier produced by the DPI operations to the application or class identifiers.

In some embodiments, the edge node 120 forwards the packets of the particular packet flow based on the generated first set of DPI parameters. For example, in some embodiments, the edge node 120 uses at least one parameter in the generated first set of DPI parameters to select a path through the WAN to forward the packets of the first packet flow. In some embodiments, the edge node 120 forwards a copy of the set of packets that it used for the first DPI operation of the local deep packet inspector 190, to the remote deep packet inspector 192 to perform a second DPI operation to generate a second set of DPI parameters. The edge node 120 receives the result of the second DPI operation. When the generated first and second DPI parameters are different, the edge node 120 generates a record regarding the difference.

In some embodiments, the edge node 120 uses the generated record to improve the local deep packet inspector's operation. For instance, in some embodiments, the local deep packet inspector is a third-party inspector that is used by the particular edge node, and the generated record is used to identify different flows for which the third-party inspector has poor DPI performance. When the generated record specifies a discrepancy between the first and second sets of generated DPI parameters, the edge node 120 in some embodiments send data regarding the discrepancy to a remote machine to aggregate with other data regarding other discrepancies in the DPI operations performed for other packet flows through the WAN.

In some embodiments, the edge node 120 specifies a generated first set of DPI parameters as the set of DPI parameters associated with the first packet flow, after the first DPI operation is completed. When the first and second DPI parameter sets are different, the edge node 120 modifies the set of DPI parameters associated with the first packet flow based on the generated second set of DPI parameters. For instance, in some embodiments, the edge node 120 modifies the set of DPI parameters by storing the second set of DPI parameters as the set of DPI parameters associated with the first packet flow.

Also, in the embodiments where the edge node 120 forwards the packets of the particular packet flow based on the generated DPI parameters, the edge node 120 modifies the forwarding of the packets of the first packet flow, by using the second set of DPI parameters when the generated first and second sets of DPI parameters are different. In some embodiments, the edge node 120 forwards at least a subset of the generated first and/or second DPI parameters to other edge nodes (e.g., through in-band or out-of-band communication with the other edge nodes) directly, or indirectly through the controller cluster 140. Also, in some embodiments, the edge node 120 forwards at least a subset of the generated first and/or second DPI parameters to at least one gateway (e.g., through in-band or out-of-band communication with the gateway) directly, or indirectly through the controller cluster 140.

Figure 2:
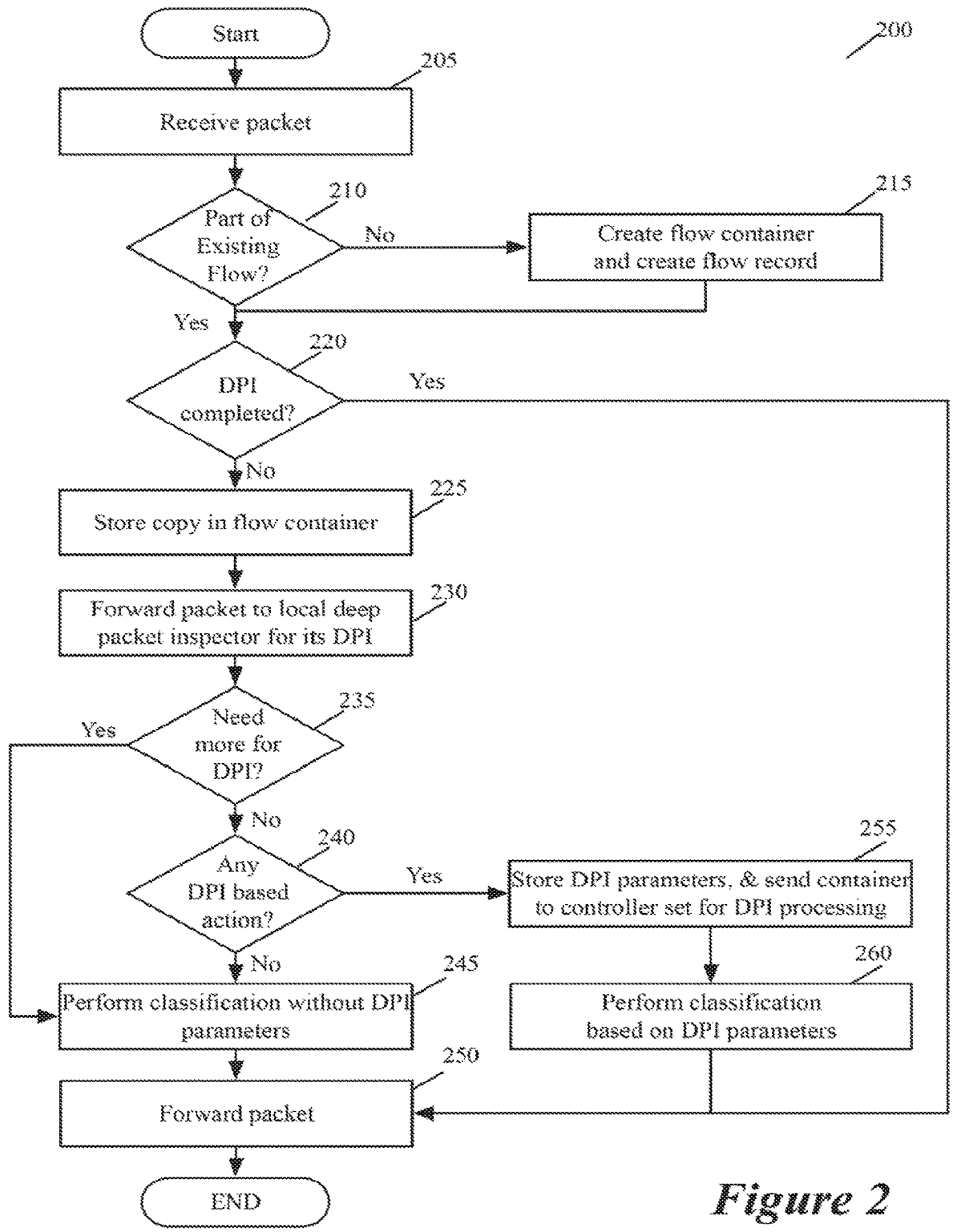
FIG. 2 conceptually illustrates a process that the edge node performs in some embodiments when it receives a packet for forwarding.

FIG. 2 conceptually illustrates a process 200 that the edge node 120 performs in some embodiments when it receives a packet for forwarding. In some embodiments, the edge node 120 performs this process for each egressing packet that it receives from inside the branch 150 for forwarding out of the branch 150, or for each ingressing packet that it receives from outside of the branch 150 for forwarding to a machine within the branch 150. In other embodiments, the edge node 120 only performs this process for each egressing packet.

As shown, the process 200 starts when the edge node receives (at 205) a packet for forwarding. Next, at 210, the process determines whether the packet is part of an existing flow that the edge node is currently processing. In some embodiments, the existing flow are two opposing flows (i.e., is a bi-directional flow) in the same connection session between a machine in the branch 150 and a machine outside of the branch 150 (e.g., in branch 152 or in a datacenter 154, 156 or 158), as the DPI operations analyzing packets exchanged in both directions in a connection session. In other embodiments, the existing flow is a uni-directional flow between these two machines (e.g., from the internal machine to the external machine).

Also, at 210, the process 200 in some embodiments treats the DPI operation that was performed for a first flow as the DPI operation for a later second flow when the first and second flows are part of a set of flows that have certain header values in common, e.g., source IP address, destination IP address and destination port. In other words, the flow determination at 210 in some embodiments decides whether a DPI operation has been performed for a set of flows that can be grouped together based on some criteria.

To determine whether the packet received at 205 is part of an existing flow, the process in some embodiments checks a connection tracking storage that stores a record of each flow that it is currently processing. In some embodiments, the connection tracking storage stores a record for each flow, with the flow's record storing the flow's identifier (e.g., the flow's five tuple identifier, which includes source and destination IP addresses, source and destination port addresses and protocol). Hence, in these embodiments, the process 200 determines (at 210) whether the received packet's flow identifier is stored in the connection tracking storage. In the embodiments where the process 200 performs a local DPI operation for a set of flows, the process 200 determines (at 210) whether the received packet's flow attributes match the flow attributes of the set of flows that is stored in the connection tracker.

If not, the process (at 215) creates a flow container to store copies of the initial packets of the flow in the flow container. At 215, the process also creates a record in its connection tracker for the received packet's flow (e.g., stores the packet's five-tuple flow identifier in the connection tracker). From 215, the process transitions to 220. The process also transitions to 220, when it determines (at 210) that the received packet is part of a flow that it is currently processing.

At 220, the process determines whether it has already completed its DPI operation for the received packet's flow. To make this determination at 220, the process in some embodiments checks another connection tracking storage that stores a record of each flow or set of flows for which it has previously completed the DPI operations. In some embodiments, each record in this connection tracking storage stores a flow identifier (e.g., five tuple identifier) of a flow or a set of flows for which the process has previously completed the DPI operations, and the DPI parameter set the process previously identified for this flow. Conjunctively, or alternatively to storing the DPI parameter set, each record stores a forwarding decision, or other forwarding operation (such as egress queue selection), that the edge node previously made based on the DPI parameter set that it previously identified for the flow.

When the process determines (at 220) that it has previously completed the DPI operations for the received packet's flow or flow set, it transitions to 250, where it will forward the packet based on the forwarding operation(s) that it previously decided based on the previously identified DPI parameters for the flow or flow set. These forwarding operations in some embodiments include any combination of the following: selecting the path along which the packet should be sent, selecting the egress queue in which the packet should be stored before forwarding, specifying QoS parameters for the packet for other gateways or edge nodes to use, etc.

When the process determines (at 220) that it has not previously completed the DPI operations for the received packet's flow or flow set, the process stores (at 225) stores a copy of the received packet in the flow container defined at 215 or defined previously for an earlier packet in the same flow. Next, at 230, the process provides the received packet to the local deep packet inspector 190 to perform its DPI operation.

At 235, the process determines whether the local deep packet inspector 190 was able to complete its operation based on the received packet. In some embodiments, the process makes this determination based on a response that it receives from the local deep packet inspector 190. The local inspector 190 in some embodiments returns a set of one or more DPI parameters for the received packet's flow when it has completed its operation, while it returns a reply that indicates that it has not yet completed its operations when it needs to analyze more packets of this flow.

When the process determines (at 235) that the local inspector 190 needs more packets to analyze, the process performs (at 245) a forwarding classification operation without reference to any DPI parameter values, forwards (at 250) the received packet based on this forwarding classification operations, and then ends. In some embodiments, the forwarding classification operation involves matching the received packet's attributes (e.g., its flow identifier or the attribute set of its flow set) with one or more match-action rules that specify the next hop interface for the packet and the tunnel attributes that should be used to encapsulate and forward the packet to the next hop.

In the above-described approach, neither the edge node nor the local deep packet inspector perform a soft termination for the connection session associated with the received packet, while the local DPI inspector can perform its DPI operation. Under this approach, the packets are forwarded (at 250) after their classification (at 245). In other embodiments, the edge node or the local deep packet inspector perform a soft termination for the connection session associated with the received packet, so that the local DPI operation can perform its DPI operation. In some of these embodiments, the edge node 120 does not forward any of the initial packets in this flow out of the branch 150, and instead stores these packets in the container until the local DPI operation has been completed so that it can perform an action (e.g., a forwarding decision) based on the DPI operation.

When the process 230 determines (at 235) that the local deep packet inspector 190 was able to complete its operation based on the received packet, it determines (at 240) whether it has to perform a DPI based action on the packet. As mentioned above, the returned set of DPI parameters include different DPI parameters in some different embodiments. Examples of these parameters include traffic-type identifiers, source application type identifiers, class identifiers, etc. In some embodiments, the local deep packet inspector does not generate an identifier for the source application or class. In these embodiments, the controller cluster generates one or both of these identifiers by mapping the traffic type identifier produced to the local DPI operations with the application or class identifiers.

Based on the returned DPI parameter set, the edge node 120 in some embodiments performs its forwarding operation on packet flows associated with some of the DPI parameters. For example, in some embodiments, the edge node 120 selects a faster path (i.e., a path with a low latency) or a more resilient path (i.e., a path with a very low failure rate) for packets associated with VOIP calls, which have to use the best available paths. Conjunctively, or alternatively, the edge node 120 in some embodiments associates these packets with a higher priority queue so that these packets can enjoy a higher quality of service (QoS).

In some of these embodiments, the edge node does not perform any special action on a packet flow unless the flow is associated with one or more particular DPI parameters by the DPI inspectors 190 or 192. Accordingly, when the process determines (at 240) that DPI parameter set for the received packet's flow is not associated with any special type of action, the process performs (at 245) its forwarding operations without reference to any DPI parameter values, and forwards (at 250) the received packet and any packet it previously stored for this flow based on these forwarding operations.

In some embodiments, the process performs these forwarding operations by matching the flow's identifier with one or more match-action forwarding rules that identify tunneling parameters (e.g., tunnel identifier, etc.) and forwarding parameters (e.g., next hop forwarding interface, destination network addresses (IP, port, MAC, etc.), etc.), and then encapsulating and forwarding the flow's packet(s) based on the tunneling and forwarding parameters, as mentioned above. At 245, the process in some embodiments also stores an indication that the local DPI inspector 190 did not provide DPI parameters requiring any special treatment of the flow, while in other embodiments it does not store any such indication at 245.

Also, in FIG. 2, the process 200 does not request the remote deep packet inspector 192 to analyze the received packet's flow when it determines (at 240) that it does not have to perform any special operation on the flow based on the DPI parameter(s) returned by the local inspector 190. In other embodiments, however, the process directs the remote inspector 192 to analyze the received packet's flow even when it determines (at 240) that it should not perform any special operation on the flow based on the parameters returned by the local inspector.

The process transitions from 240 to 255 when it determines that it should perform special operations on the received packet's flow based on the parameters returned by the local inspector 190. For the received packet's flow, the process stores (at 255) the locally generated set of DPI parameters (i.e., generated by the local DPI inspector 190) in a storage (e.g., a database) that associates flows with DPI parameter sets. The process stores this DPI parameter set for subsequent reporting operations and/or for comparison with remotely generated DPI parameters.

It also sends (at 255) the copies of the initial set of packets that the local deep packet inspector 190 examined to the remote deep packet inspector 192. This initial set of packets includes any packet stored in the flow container that was created for the initial flow's packet at 215 and in which one or more packets were stored at 225 in each iteration of the process 200 for the flow. To the remote deep packet inspector 192, the process in some embodiments sends (at 255) the locally generated set of DPI parameters (i.e., the DPI parameter set generated by the local inspector 190) along with the initial set of packets.

At 260, the process uses one or more of the DPI parameters identified by the local deep packet inspector 190 to perform its forwarding classification operations. In some embodiments, the process performs these forwarding operations by matching the flow's identifier and one or more DPI parameters with one or more match-action forwarding rules that identify tunneling parameters (e.g., tunnel identifier, etc.) and forwarding parameters (e.g., next hop forwarding interface, etc.). Based on the tunneling and forwarding parameters identified at 260, the process then encapsulates and forwards (at 250) the received packet, and then ends.

In some embodiments, DPI-based forwarding classification operation at 260 might change the path through the WAN that was selected for earlier packets of the flow by the DPI-independent forwarding classification operation at 245. For instance, after selecting a slow path through the WAN for a particular flow before the completion of the local DPI operation, the edge node in some embodiments can select a faster path once the local DPI operation has been completed and this DPI operation specifies that the flow is associated with an application that requires the use of best available paths.

Instead of modifying the path of the flow for which the local DPI operation was performed, the process 200 in other embodiments stores the identified DPI parameter for the associated flow set, and then uses the stored DPI parameter to select the fast path for a subsequent flow in the same flow set as the current flow. Also, for the current flow or a subsequent flow in the same flow set, the process 200 performs (at 250 or 260) other forwarding operations based on the DPI parameter set identified by the local DPI operation for the current flow. For instance, in some embodiments, the process 200 specifies a higher priority egress queue to provide a higher QoS for the current flow or the subsequent flow in the flow set, based on the identified DPI parameter set. In some embodiments, the process 200 also includes in the tunnel header of the current flow or subsequent flow a QoS parameter that informs the gateway(s) or destination edge node of the higher priority of the current flow or subsequent flow.

In some embodiments, the edge node 120 forwards each packet to its destination after the local deep packet inspector has processed the packet. In other embodiments, however, the edge node 120 delays the forwarding of packets to the destination of the flow while performing the local DPI operation. During this time, the edge node stores the delayed packets in the specified flow container for the packet flow (i.e., a storage queue that the edge node defines for the packet flow). Once the first DPI operation has been completed, the edge node then forwards the set of packets stored in the storage queue as well as subsequent packets of the first flow to the destination. For certain locally identified DPI parameters, this forwarding is based on the DPI parameters (e.g., for certain DPI parameters, the next-hop/path selection is based on the DPI parameters). The edge node 120 in these embodiments also forwards a copy of the set of packets stored in the storage queue to the remote deep packet inspector.

In some embodiments, the number of packets stored in a flow container for a particular packet flow depends on the number of packets that the local deep packet inspector 190 needs to complete its DPI operation. Specifically, in some embodiments, the local deep packet inspector needs to examine different number of packets for flows from different types of source applications in order to assess the traffic type, source application type, the class type, etc. However, typically, the number of packets is in the range of 10-20 packets for many applications.

Figure 3:
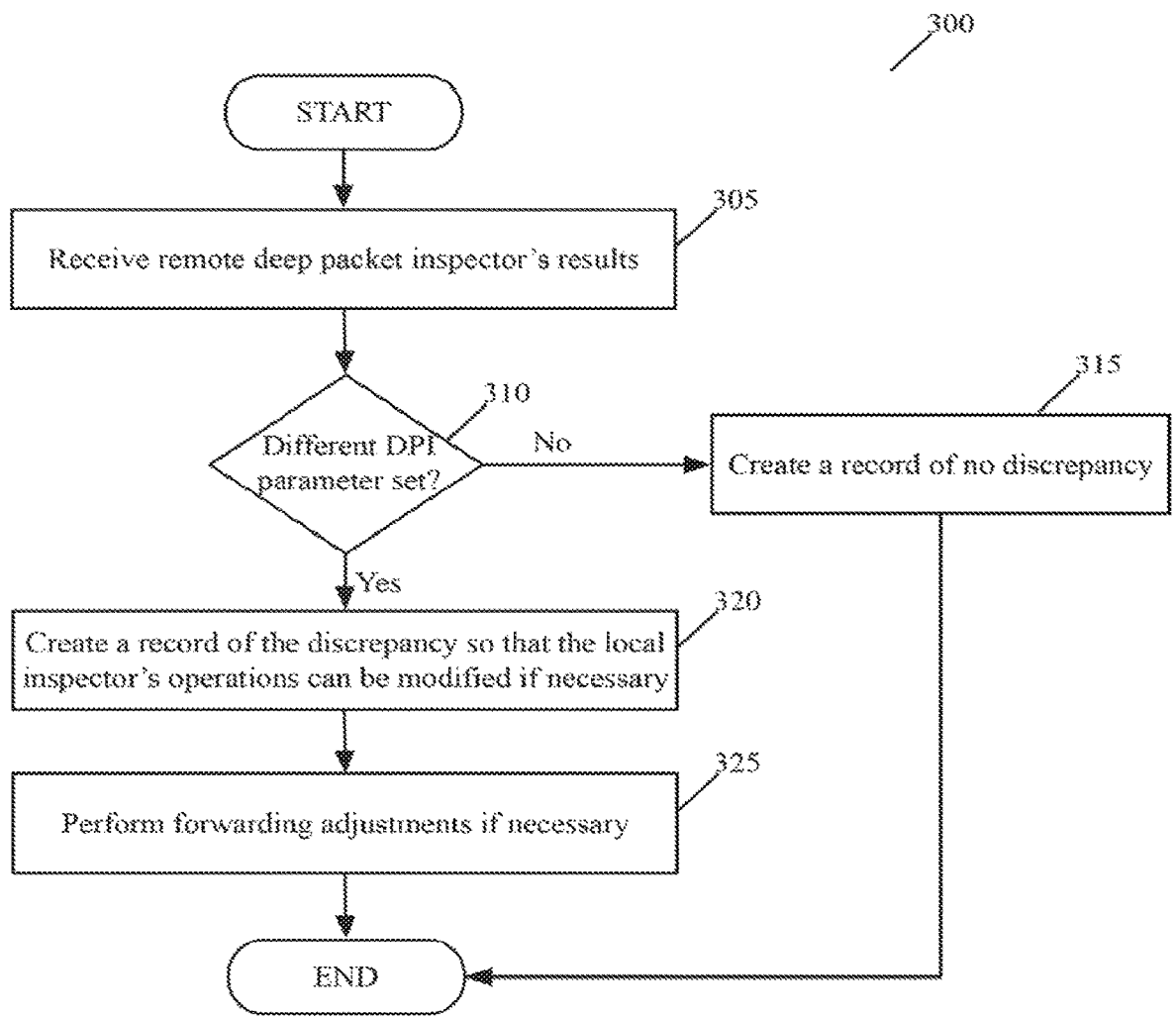
FIG. 3 conceptually illustrates a process that the edge node performs when it receives the results of the DPI operation of the remote deep packet inspector for a particular flow.

FIG. 3 conceptually illustrates a process 300 that the edge node 120 performs when it receives the results of the DPI operation of the remote deep packet inspector 192 for a particular flow. For certain packet flows (e.g., packet flows for which the local packet inspector 190 generates a particular DPI parameter), the edge node 120 in some embodiments forwards to the remote deep packet inspector 192 a copy of an initial set of packets that the local deep packet inspector 190 used to perform its DPI operations. In other embodiments, the edge node 120 forwards to the remote deep packet inspector 192 more packets of a flow to analyze than the number of packets that it provides to the local deep packet inspector 190.

As shown in FIG. 3, the process starts (at 305) when the edge node 120 receives the result of the second DPI operation from the remote deep packet inspector 192. It then determines (at 310) whether the second DPI operation produced a different second set of DPI parameters than the first set of DPI parameters produces by the local deep packet inspector 190. When the two sets of DPI parameters match, the remote deep packet inspector 192 in some embodiments just returns an indication of the match. Alternatively, when the second DPI-parameter set does not match the first DPI-parameter set, the remote deep packet inspector 192 returns the second DPI parameter set in an encoded or unencoded format.

When the process determines (at 310) that the second DPI parameter set produced by the remote DPI operation matched the first DPI parameter set produced by the local DPI operation, the process creates (at 315) a record for the particular flow to indicate that there was no discrepancy between the two sets of DPI parameters, and then ends. This record in some embodiments is just another field in the record that the process 200 created (at 255) in the edge node's DPI parameter storage to store the DPI parameter set for the particular flow.

Alternatively, when the process determines (at 310) that the first and second DPI parameter sets do not match, the process creates (at 320) a record of this discrepancy. For instance, the process in some embodiments identifies (at 320) the second DPI parameter set as the DPI parameter set associated with the particular flow. The process does this in some embodiments by storing the second DPI parameter set in the record that was created in the edge node's DPI parameter storage for the particular flow. In some embodiments, the process also sets (at 320) a value of a field in this record to designate the discrepancy between the local and remote DPI operations.

The process 300 also stores (at 320) in this record or another record the first DPI parameter set that was produced by the local deep packet inspector 190, and that has been replaced by the second DPI parameter set. In some embodiments, the process 300 maintains the first DPI parameter set because this record is used to improve the local deep packet inspector's operation. For instance, in some embodiments, the local deep packet inspector is a third-party inspector that is used by the particular edge node, and the generated record is used to identify different flows for which the third-party inspector has poor DPI performance. When the generated record specifies a discrepancy between the first and second sets of generated DPI parameters, the edge node 120 in some embodiments sends data regarding the discrepancy to a remote machine to aggregate with other data regarding other discrepancies in the DPI operations performed for other packet flows through the WAN. This data is then analyzed in some embodiments to modify the operation of the local deep packet inspector.

In the embodiments where the edge node 120 forwards the packets of the particular packet flow based on the generated DPI parameters, the process 300 determines (at 325) whether it needs to modify its forwarding of the packets of the particular flow based on the second DPI parameter set received from the remote deep packet inspector 192. If so, the edge node 120 modifies this forwarding.

Figure 4:
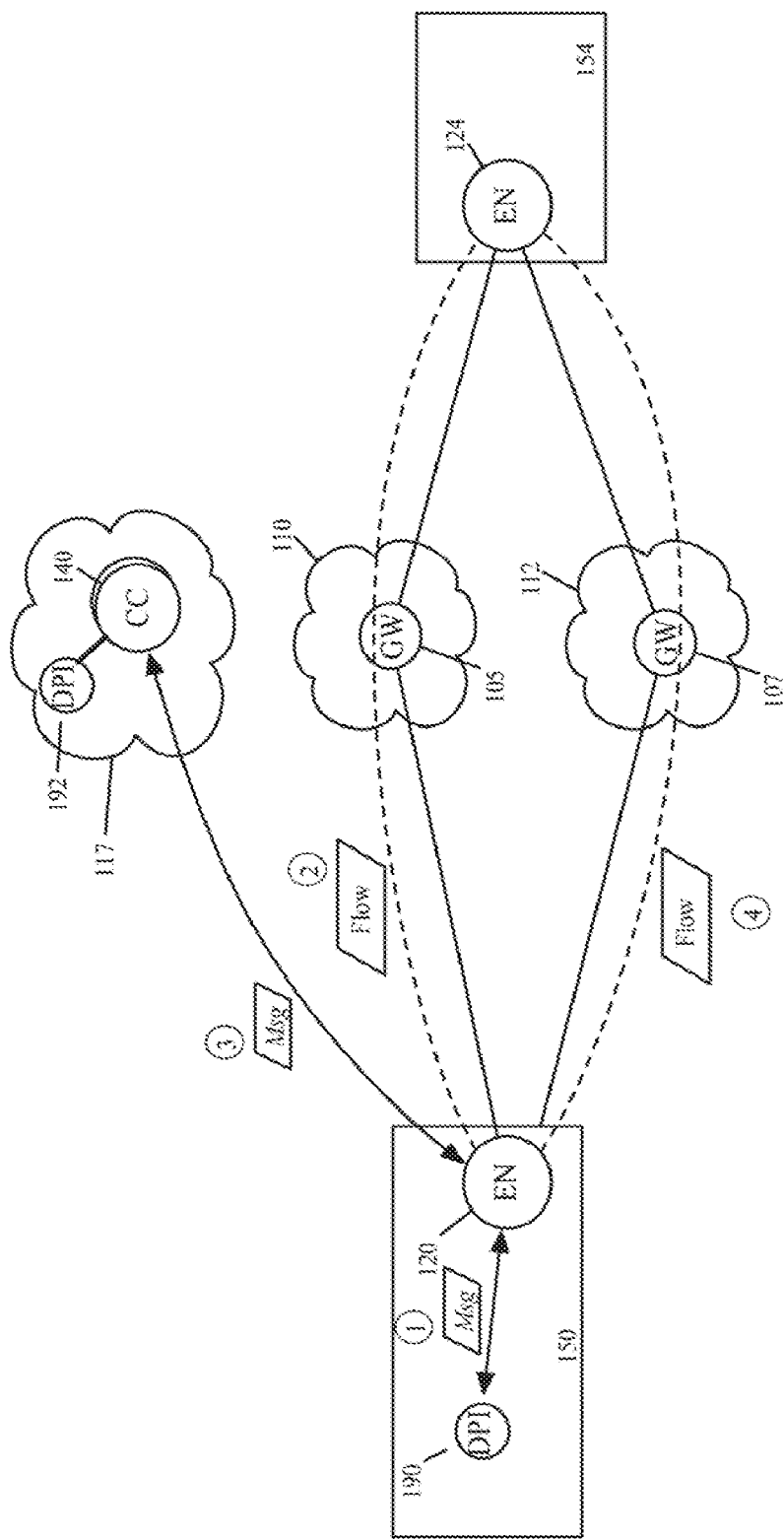
FIG. 4 illustrates an example modifying the path selected for a particular flow.

FIG. 4 illustrates an example modifying the path selected for a particular flow. Specifically, for the example illustrated in FIG. 1, FIG. 4 illustrates the edge node 120 initially forwarding the particular flow to the gateway 105, which is along a first path to the edge node 124. This selection of the gateway 105 as the next hop is based on the first set of DPI parameters generated by the local deep packet inspector 190. The edge node 190 uses one or more parameters in this set to select the gateway 105 instead of selecting the gateway 107, which is on a second path to the edge node 124. The second path in this example has lower latency and is used for higher priority packets. However, the edge node 120 initially does not select the gateway 107 and its associated second path because the first set of DPI parameters do not include any parameter that is associated with a high priority flow.

FIG. 4 also illustrates the edge node receiving the second set of DPI parameters from the remote deep packet inspector 192. Based on the second DPI parameter set, the edge node 120 starts to forward the particular flow through the gateway 107 and the second path. In this example, the second set of DPI parameters has one DPI parameter that is associated with a high priority flow (e.g., has a traffic-type identifier that specifies the flow's payload contains VOIP data). The edge node 120 matches the second DPI parameter set and the flow identifier of the particular flow with a match-action rule that specifies the gateway 107 as the next hop of the path to select.

Some embodiments provide a method that uses DPI-generated parameters to assess and in some case modify how flows associated with particular applications traverse an SD-WAN. At a set of one or more servers, the method receives sets of DPI parameters collected for packet flows processed by a first set of edge nodes for which DPI operations were performed. From these collected sets, the method identifies a subset of DPI parameters associated with a plurality of flows relating to a particular application identifier specified by the DPI operations.

The received DPI parameters sets in some embodiments include operational statistics and metrics (e.g., packet transmission time, payload size, current number of packets processed by the node, etc.) relating to the packet flows processed by the first-set edge nodes. The statistics in some embodiments are accompanied by other data such as the flow identifiers, application classification details and forwarding decisions (e.g., identifying selected paths), etc. In some embodiments, the operational statistics, metrics and other data are collected and provided by the edge nodes and/or the gateways.

The method then analyzes the identified subset of parameters to determine whether any packet flow associated with one or more particular DPI parameters had an undesirable metric relating to its flow through the WAN. When this analysis produces a decision that the edge nodes should use different paths for the flows associated with the particular application identifier, the method then distributes adjusted next-hop forwarding records to a second set of one or more edge nodes to modify the paths that the edge nodes use to forward flows associated with the particular application identifier. In some embodiments, the first and second set of edge nodes are identical, while in other embodiments the first set of edge nodes is a subset of the second set of edge nodes (e.g., the second set includes at least one node not in the first edge).

Figure 5:
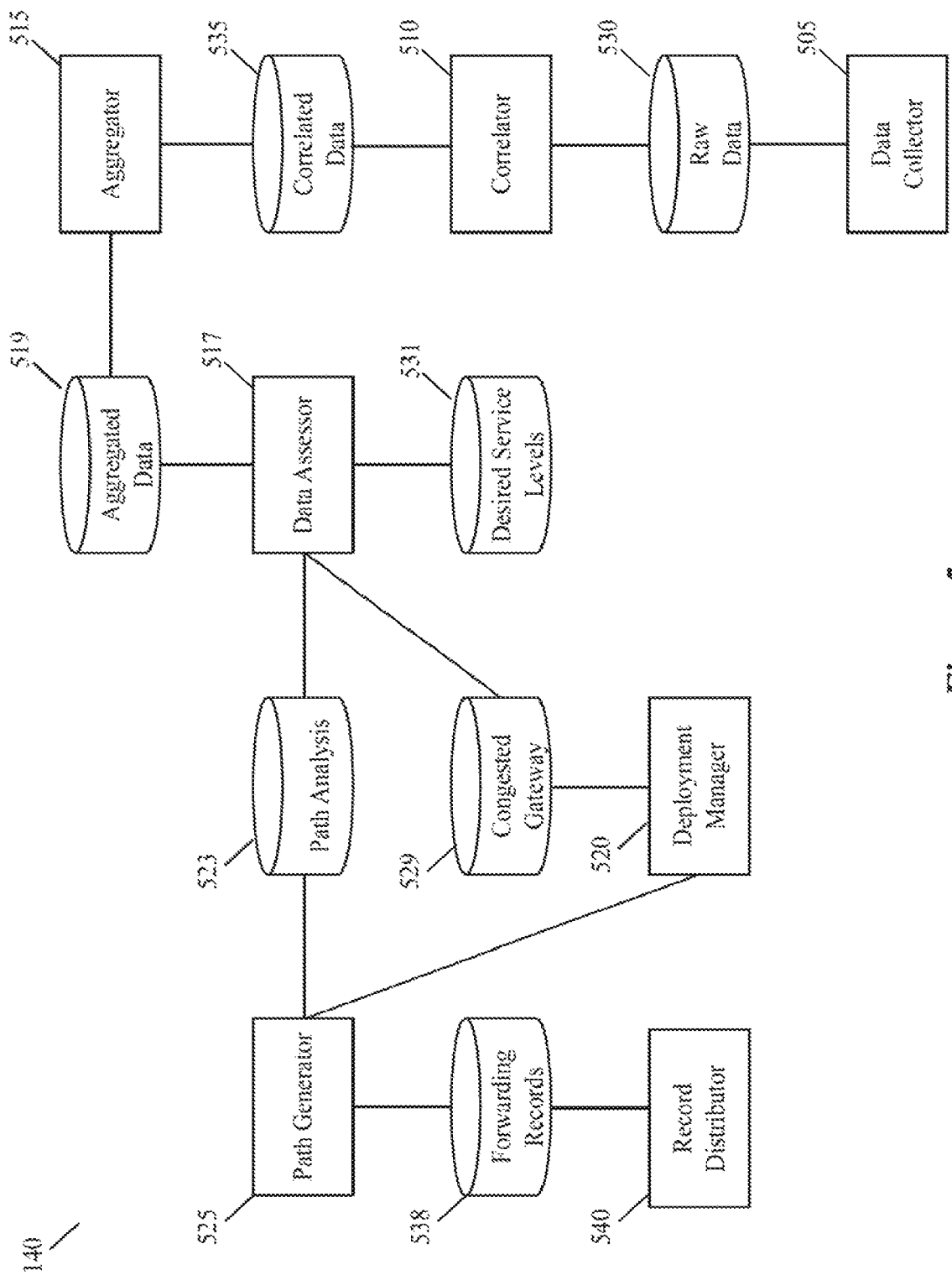
FIG. 5 illustrates the components of a controller cluster that perform the above-described operations.

The above-described method is implemented by the controller cluster 140 of FIG. 1 in some embodiments. FIG. 5 illustrates the components of the controller cluster that perform the above-described operations. As shown, the controller cluster 140 in some embodiments includes a data collector 505, a data correlator 510, a data aggregator 515, a data assessor 517, a gateway deployment manager 520, and a path generator 525. In some embodiments, these components operate on one computer, while in other embodiments they operate on multiple computers. For scalability, each component can be implemented by a cluster of similar processes in some embodiments.

The operation of the components of the controller cluster 140 in FIG. 5 will be described by reference to FIG. 6, which conceptually illustrates a process 600 that the controller cluster 140 performs periodically in some embodiments. From the edge nodes and/or gateways, this process collects data for flows associated with certain DPI parameters. It correlates the collected data to associated data regarding the same flows, and then analyzes the collected data to derive additional statistics/metrics regarding each flow. The process then compares the collected and derived data for a flow with desired service level metrics/statistics for DPI parameters associated with the flow to identify when flow is not getting the desired level of service (e.g., a flow associated with a particular application identifier is not reaching its destination fast enough).

When it identifies one or more flows that are not getting the desired level of service, the process 600 distributes to the edge nodes and/or gateways adjusted next hop forwarding records that direct the edge nodes and/or gateways to modify the forwarding of the particular flow, or similar future flows (e.g., flows from with the same DPI identified application and/or to the same destination). For instance, based on the distributed path adjustment values, the source edge node selects a different gateway to forward the packets of the particular flow and other similar subsequent flows in some embodiments. In other embodiments, the source edge node uses the distributed adjusted next hop forwarding records to select the gateway(s) to use for forwarding subsequent flows that are similar to the particular flow (e.g., flows with the same DPI identified application and to the same destination).

Figure 6:
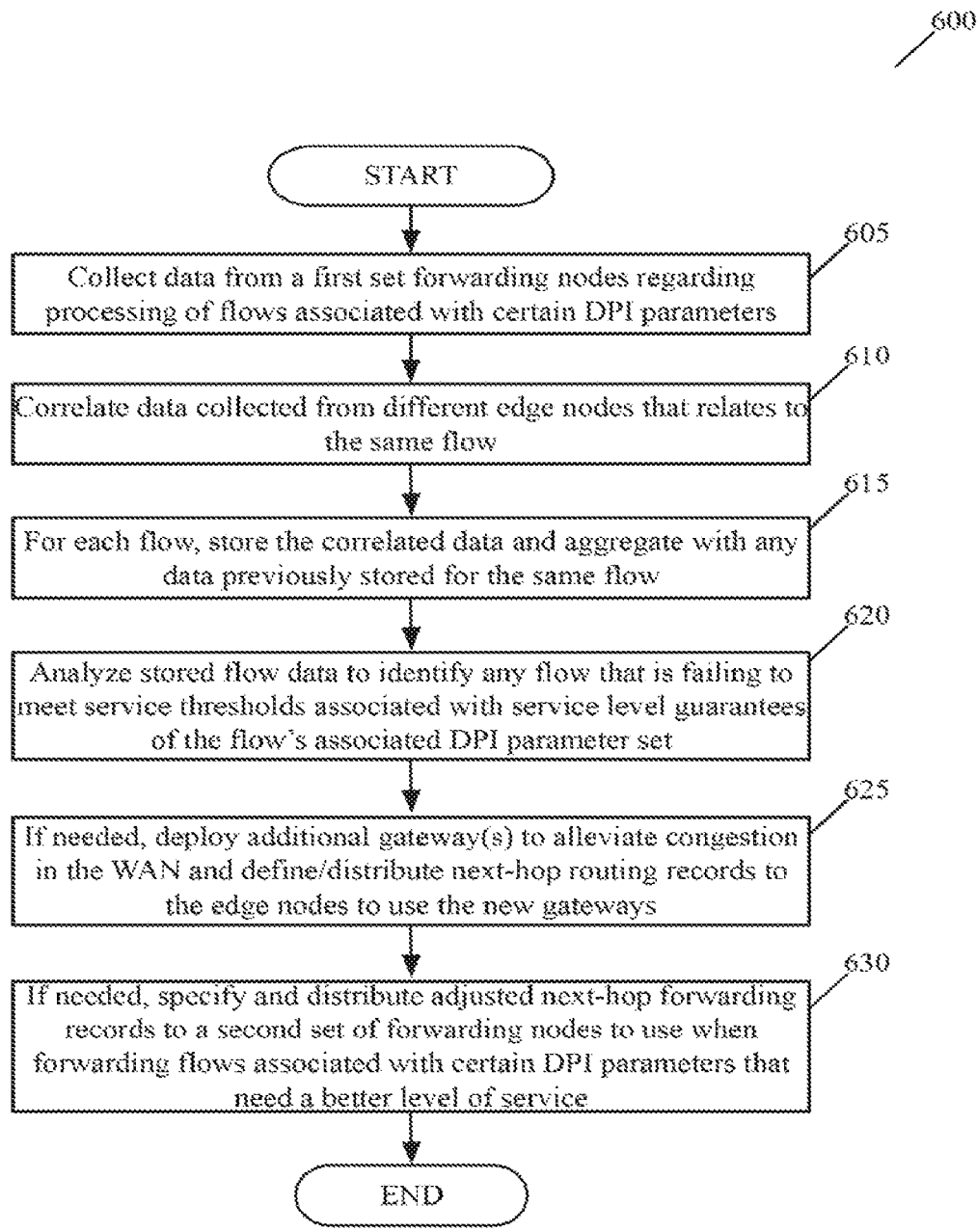
FIG. 6 conceptually illustrates a process that the controller cluster performs periodically in some embodiments.

As shown in FIG. 6, the data collector 505 in some embodiments collects (at 605) data from a first set of SD-WAN forwarding nodes regarding the nodes' processing of flows associated with a set of one or more DPI parameters. For instance, in some embodiments, the data collector gathers data regarding processing of flows associated with one or more traffic-type identifiers (e.g., VOIP calls, video conferences, etc.). In other embodiments, the data collector gathers data regarding the processing of all flows passing through the first-set forwarding nodes.

In some embodiments, the first-set forwarding nodes are only a subset of the SD-WAN forwarding nodes, and the collected set of data pertains to the flows of a subset of tenants (e.g., one tenant) of the SD-WAN. As further described below, the process 600 collects data from only a subset of the forwarding nodes, but shares the results of the analysis of this data with a larger set of SD-WAN forwarding nodes. Similarly, while collecting data for only a subset of the tenants, the process uses the results of the analysis of this data with a larger set of tenants (e.g., all tenants or all tenants that use a certain SaaS application). The first-set forwarding nodes in some embodiments are just the SD-WAN edge nodes that serve as the sources and destinations of flows through the network. In other embodiments, the first-set forwarding nodes include the SD-WAN cloud gateways (e.g., gateways 105 and 107) as well.

The collected data in some embodiments includes operational statistics and metrics of the flows (e.g., average packet transmission time, average packet delay, average payload size, etc.). These operational statistics and metrics are collected by the first-set forwarding nodes for the packet flows processed by these nodes. In some embodiments, the collected data also includes operational statistics and metrics of the forwarding nodes. Examples of such statistics and metrics include queue depth, queue delay, number of packets processed by the node per some duration of time, etc.

As mentioned above, the collected records identify flow identifiers, application classification details and forwarding decisions (e.g., identifying selected paths), etc. The collected record include flow and/or forwarding node statistics/metrics that are associated with one or more DPI parameters, which were specified by DPI operations that were performed while processing these flows at the forwarding nodes in some embodiments. In some embodiments, the DPI operations for a flow are performed at the source edge node (also called ingress edge node) where the flow enters the WAN and from where it is passed to another edge node or to a cloud gateway. Conjunctively with the DPI operations, the source edge node collects operational metrics and statistics (e.g., packet transmission time, payload size, current number of packets processed by the node, etc.) for the packets of the flow that it passes to another edge node or a cloud gateway, and provides the DPI generated parameters along with the collected statistics to the server set for its analysis.

In some embodiments, the SD-WAN forwarding nodes continuously collect statistics/metrics for flows while processing flows. In other embodiments, these forwarding nodes collect the statistics/metrics for flows just at the start of the flows, in order to reduce the amount of resources consumed (e.g., CPU resources, memory resources) by the data collection. For instance, in some embodiments, the source edge node collects statistics for a flow based on a number of initial packets that it uses to perform its DPI operations. The source edge node in some of these embodiments provides to the controller set the initial set of packets that it uses for its DPI operations for a flow, along with the operational metrics and statistics that it provides to the server set for a new flow. In some embodiments, the number of packets in the initial packet set that is analyzed by the source edge node's DPI operation is dependent on the application that is being identified as the source of the flow by the DPI operations. Accordingly, the DPI operations analyze different number of packets for different flows that are from different applications or different types of applications.

The destination edge nodes (also called egress edge nodes) in some embodiments also perform DPI operations and collect operational metrics/statistics for the flows at the start of flows that they received through the WAN (i.e., from cloud gateways or other edge nodes). In other embodiments, the destination edge nodes do not perform DPI operations, but collect operational metrics/statistics for the flows (e.g., continuously or just at the start of flows). In some embodiments, the destination edge nodes receive (e.g., in-band with the packets through tunnel headers, or out-of-band through other packets) one or more DPI parameters (e.g., application identifiers) generated by the source edge node's DPI operation.

The destination edge nodes in some embodiments receive instructions from source edge nodes that directs the destination edge nodes to collect statistics/metrics regarding certain flows. For instance, in some embodiments, the source edge nodes set flags in the tunnel encapsulation headers that these edge nodes use to forward packets to the gateways, in order to direct the destination edge nodes to collect statistics for certain flows. The gateways in these embodiments forward these flags when they forward encapsulated packets to the destination edge nodes.

In some embodiments, the data collector 505 also collects statistics/metrics from the gateways regarding the processing of the flows. In some embodiments, the source edge nodes set flags in the tunnel encapsulation headers that these edge nodes use to forward packets to the gateways, in order to direct the gateways to collect statistics for certain flows. Also, conjunctively or alternatively to performing DPI operations at the edge nodes, some embodiments perform DPI operations outside of the edge nodes (e.g., at physical locations that are remote form physical locations at which the edge nodes operate).

The data collector 505 stores the data received at 605 in a raw data storage 530 of the controller cluster 140. In some embodiments, the correlator 510 then correlates (at 610) the different records stored in the raw data storage 530 that were collected from the different edge nodes and/or gateways for the same flow. To correlate these records, the correlator 510 uses the flow identifiers (e.g., five tuple identifiers of the flows) to identify records that were collected from the different forwarding elements of the SD-WAN (e.g., from the source edge nodes, destination edge nodes and/or the gateways) that relate to the same flow.

In different embodiments, the correlator 510 correlates the related, collected flow records differently. In some embodiments, it creates an association (e.g., a reference in each record to a data structure that stores are related records) between the related records of a flow. In other embodiments, it merges a set of related records for a flow into one record. Still other embodiments correlated the related flow records differently. Also, in some embodiments, each correlated set of related records are associated with a set of DPI generated parameters (e.g., with a particular application identifier or traffic-type identifier).

The correlator 510 stores the correlated records for each flow in the correlated data storage 535. The aggregator 515 retrieves the correlated records from this storage 535, derives additional statistics/metrics from these records, stores the provided and derived statistics/metrics for flows that it has not previously identified, and blends the provided and derived statistics/metrics with statistics/metrics that it previously stored for flows that it has previously identified.

Specifically, once the collected metrics/statistics are correlated for a particular flow, the aggregator 515 analyzes the collected metrics/statistics to derive additional operational data that quantifies whether the particular flow is getting the desired level of service. The correlated metric/statistic data in some embodiments are associated with specific DPI generated parameters (e.g., application identifier, etc.) so that the analysis in some embodiments is done on the DPI-parameter basis. For instance, the derived data in some embodiments is used to ascertain whether a particular flow associated with a particular application identifier reaches its destination within desired duration of time, whether the particular flow was delayed too much at a particular gateway, etc.

The following is one example of how the aggregator derives statistics/metrics for a flow from the flow's collected, correlated records. In some embodiments, the collected records for a flow specify on a per packet basis the time that the packet left a source edge node, arrived at a gateway node, left the gateway node and arrived at a destination edge node. After these records are correlated, the aggregator 515 computes an average transit time that the flow's packets took to traverse from the source edge node to the destination edge node.

If the aggregator has not processed statistics/metrics for this flow before, the aggregator creates a record in an aggregated data storage 519 for this flow, and stores in this record, the collected and correlated statistics/metrics for this flow along with any statistics/metrics (e.g., the computed average transit time for the flow) that the aggregator derived for this flow. For some flows, this storage already has previously stored records as the aggregator previously processed statistics/metrics for these flows. Hence, for each such flow, the aggregator 515 in some embodiments aggregates the newly collected and derived statistics/metrics with previously collected and derived statistics/metrics for the flow. This aggregation operation in some embodiments uses a weighted sum to blend new statistics/metrics with the previously stored statistics/metrics. The weighted sum in some embodiments ensures that a flow's associated statistics/metrics do not fluctuate dramatically each time a new set of statistics/metrics are received.

In some embodiments, the aggregator also processes the statistics/metrics stored in the correlated data storage 535 for the gateways, in order to blend new statistics/metrics that are stored for the gateways in this storage with statistics/metrics that it previously stored for the gateways in the aggregated data storage 519. To blends these statistics/metrics, the aggregator 515 in some embodiments uses weighted sum to ensure that a gateway's associated statistics/metrics do not fluctuate dramatically each time a new set of statistics/metrics are received.

Figure 7:
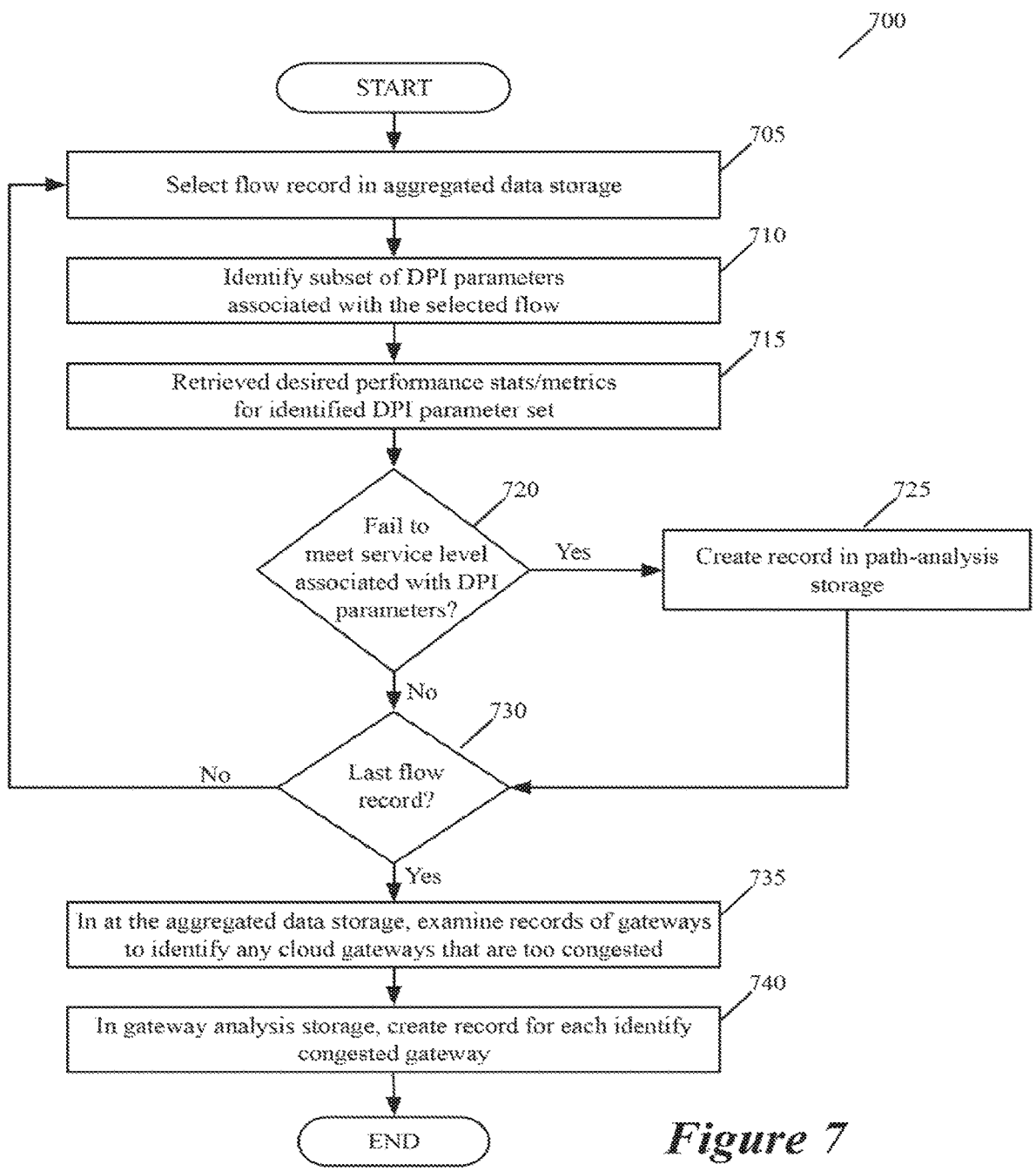
FIG. 7 conceptually illustrates a process that an assessor performs to identify flows with poor performance and congested gateways.

The data assessor 517 analyzes the statistics/metrics stored in the aggregated data storage 519 to identify any flow associated with a particular set of DPI parameters that is not getting the desired level of service from the SD-WAN. The data assessor 517 also analyzes the stored statistics/metrics to identify any congested gateways. FIG. 7 conceptually illustrates a process 700 that the assessor 517 performs to identify such flows and gateways. In some embodiments, the data assessor periodically performs the process 700.

As shown, the process selects (at 705) a flow's record in the aggregated data storage 519 and identifies (at 710) the subset of DPI parameters (e.g., application identifier, traffic-type identifiers, etc.) associated with this flow. In some embodiments, the identified DPI parameter subset is stored with the selected flow's record, while in other embodiments, it is referenced by this record. From a service level storage 522, the process 700 then retrieves (at 715) a desired set of service performance statistics/metrics from a service level storage 531 for the identified subset of DPI parameters.

The process next determines (at 720) whether the statistics/metrics stored in the retrieved flow's record fail to meet any of the desired service performance statistics/metrics for the identified subset of DPI parameters (e.g., are above desired service performance thresholds). Some embodiments have different service level guarantees for flows associated with different DPI parameters. For instance, in some embodiments, flows associated with a first traffic-type identifier cannot have a delay of more than a first temporal duration at a cloud gateway, while flows associated with a second traffic-type identifier cannot have a delay of more than a second temporal duration at a cloud gateway. Conjunctively or alternatively, in some embodiments, flows associated with a first traffic-type identifier have to reach their destination edge node within one temporal duration, while flows associated with a second traffic-type identifier have to reach their destination edge node within another temporal duration.

When the process determines that the statistics/metrics stored in the retrieved flow's record fail to meet any of the desired service performance statistics/metrics for the identified subset of DPI parameters, the process stores (at 725) a record for the flow in the path-analysis storage 523 so that this flow's path through the SD-WAN can be further analyzed, and then transitions to 730. The process also transitions to 730 when it determines (at 720) that the flow's stored statistics/metrics meet the desired service performance statistics/metrics. At 730, the process determines whether it has examined all the flow records. If not, it returns to 705 to select another flow record and repeats its operations for this record. Otherwise, it transitions to 735.

At 735, the process steps through the records for the cloud gateways in the aggregated data storage 519 to identify any cloud gateways that are too congested. In some embodiments, the process generally determines whether a cloud gateway is too congested in general for all flows. In other embodiments, the process makes this determination for flows associated with a particular set of one or more DPI parameters. For instance, in some such embodiments, the process determines whether a cloud gateway is too congested to process flows associated with a particular traffic-type identifier. The process 700 stores (at 740) in the gateway analysis storage 529 a record for each cloud gateway that it identifies as being too congested, and then ends.

After the data assessor 517 identifies the congested gateways and poorly performing flows, the gateway deployment manager 520 assesses (at 625) the gateway data, determines when and where additional cloud gateways should be deployed, and deploys these cloud gateways. In some embodiments, the cloud gateways are machines (e.g., VMs) that execute on host computers in cloud datacenters and that perform forwarding operations.

In some of these embodiments, the gateway deployment manager 520 instantiates and configures new machines to serve as new gateways in the same cloud datacenters as one or more other gateways, or in new cloud datacenters without any other gateways. In other embodiments, the gateways are previously instantiated, and the deployment manager 520 simply assigns the previously instantiated gateways to perform the desired cloud gateway service for the SD-WAN of the entity at issue.

The gateway deployment manager 520 in some embodiments deploys a new gateway to alleviate load on an existing congested gateway when the existing gateway has too much load for a certain duration of time. For instance, in some embodiments, the gateway deployment manager maintains a count of number of time periods during which an existing gateway had too much load, and only deploys a new gateway to alleviate the load on this existing gateway when the count that it maintains for this gateway reaches a particular value before being reset. In some of these embodiments, the deployment manager 520 reduces or resets when newly aggregated data does not identify as congested a gateway that was previously identified as being congested.

The gateway deployment manager 520 in some embodiments deploys a new gateway for use by all the flows. In other embodiments, the gateway deployment manager 520 deploys a new gateway for use by flows that are associated with certain DPI parameters. For instance, when the process 600 determines that the gateways that are used for VOIP calls are too congested, the deployment manager 520 in some embodiments deploys another cloud gateway to process flows that are associated with the VOIP traffic identifier.

Figure 8:
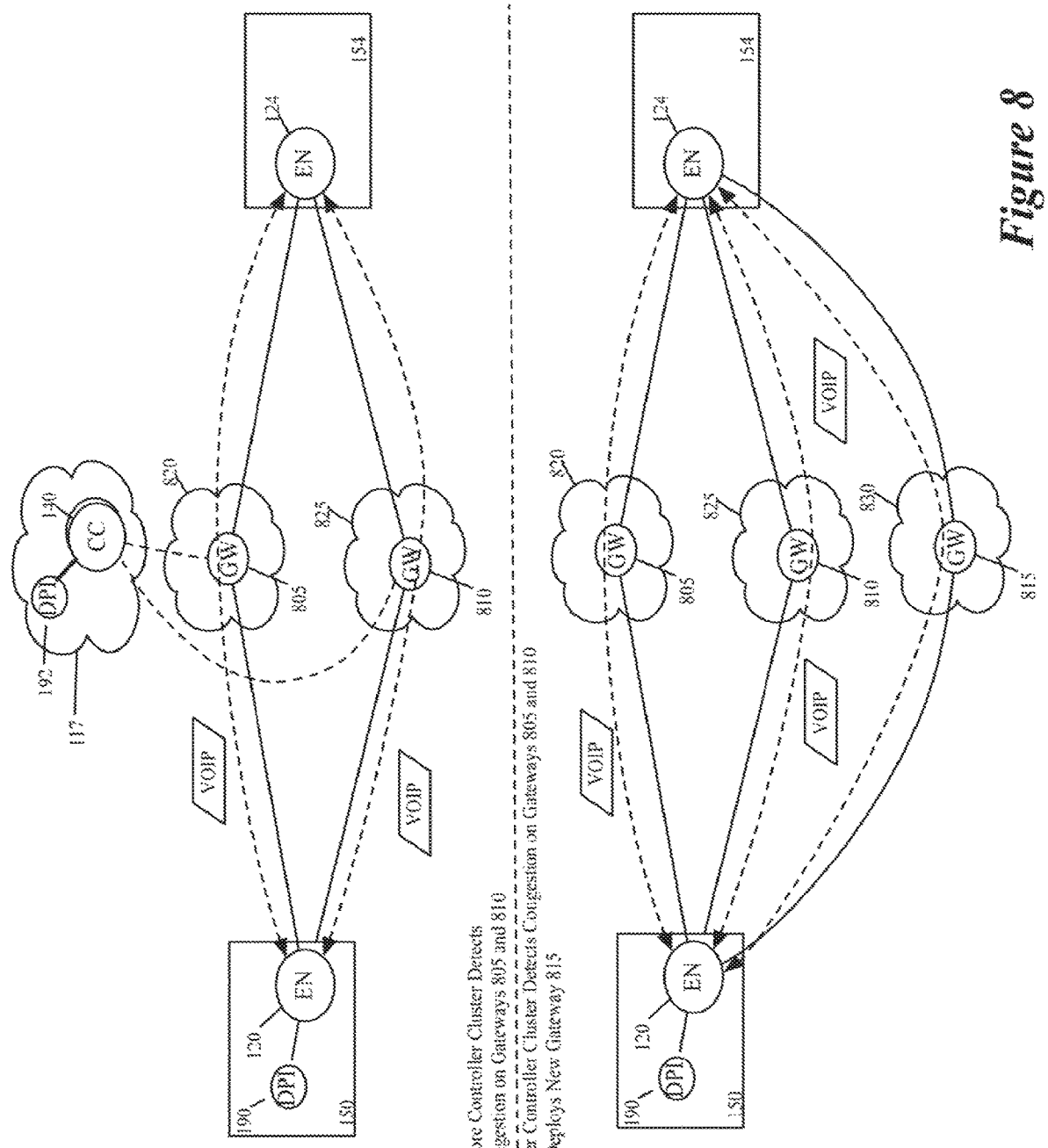
FIG. 8 illustrates a new cloud gateway being deployed for handling VOIP calls, after the controller set detects that the VOIP call load on two previously deployed cloud gateways has exceeded a certain level which prevents the VOIP calls from receiving their desired level of service.

FIG. 8 illustrates an example of this. Specifically, this figure illustrates a new cloud gateway 815 being deployed for handling VOIP calls, after the controller set detects that the VOIP call load on two previously deployed cloud gateways 805 and 810 has exceeded a certain level which prevents the VOIP calls from receiving their desired level of service. In this example, the new gateway is added in a new datacenter 830 that is different than the datacenters 820 and 825 that host cloud gateways 805 and 810. In some embodiments, the controller cluster alleviates the load on one or more cloud gateways by deploying one or more gateways in the same datacenters as the previously deployed gateways that are overloaded.

Once the deployment manager 520 deploys a new gateway, it directs (at 625) the path generator 525 to identify new paths for flows to use the newly deployed gateway, and to generate next-hop forwarding records for one or more edge nodes and gateways to use these newly identified paths. The path generator 525 stores the generated next-hop forwarding records in the record storage 538, from where the record distributor 540 retrieves and distributes the forwarding records to the specified edge nodes and/or gateways The path generator also specifies (at 630) adjusted next-hop forwarding records for a second set of edge nodes to use for one or more flows that are identified in the path-analysis storage 523 as flows that need better paths through the SD-WAN, or for future flows that have similar attributes to these identified flows. Specifically, as mentioned above, the data assessor 517 (1) analyzes the statistics/metrics stored in the retrieved flow's record to identify any flow that fails to meet a desired service performance metric for the flow's associated subset of DPI parameters, and (2) stores (at 720) a record for the flow in the path-analysis storage 523 so that this flow's path through the SD-WAN can be further analyzed. At 630, the path generator 525 explores alternative paths for each flow identified in the path-analysis storage to try to identify better paths for these flows or future similar flows in order to make it possible for these flows to meet the service level guarantees of the DPI parameters associated with the flows.

This exploration can result in the path generator identifying new gateways to deploy. When the path generator identifies such gateways, it directs the gateway deployment manager 520 to deploy the new gateways. The path generator 525 (1) generates next-hop forwarding records for one or more edge nodes and gateways to use these newly deployed gateways in order to implement the new path that it identifies, and (2) stores these next-hop forwarding records in the record storage 538, from where the record distributor retrieves and distributes the forwarding records to the specified edge nodes and/or gateways. The above-described FIG. 8 is one example of adding a gateway to improve the performance of SD-WAN paths used by flows associated with certain DPI parameters, which in this figure are flows associated with the VOIP traffic type.

Figure 9:
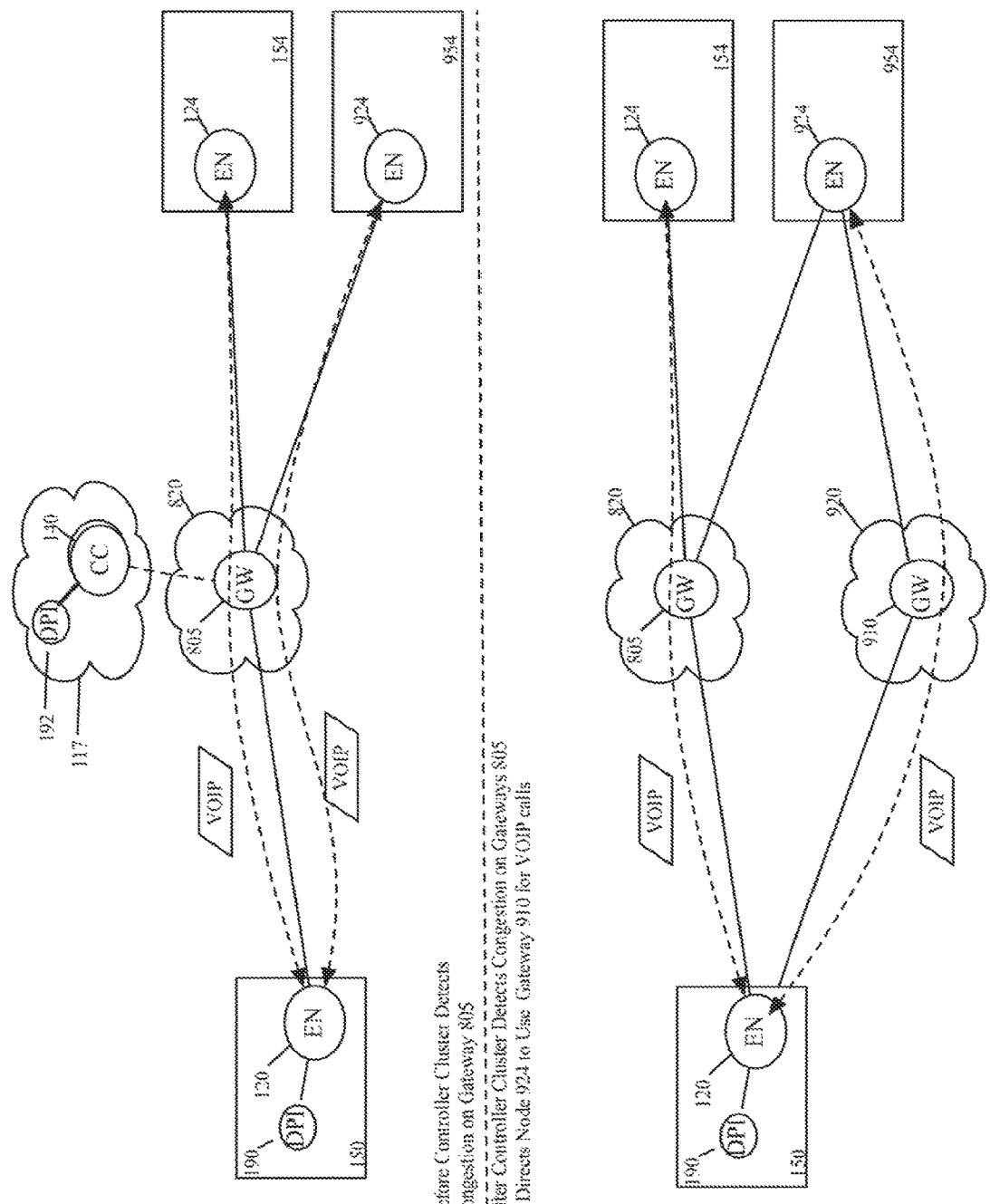
FIG. 9 illustrates the controller set detecting that the VOIP call load one previously deployed cloud gateway has exceeded a certain level which prevents the VOIP calls from receiving their desired level of service.

In some embodiments, the path generator's exploration of alternative paths can also move one subset of flows away from a gateway while maintaining another subset of flows with a gateway. FIG. 9 illustrates an example of this. Specifically, in this figure, the controller set detecting that the VOIP call load on one previously deployed cloud gateway 805 has exceeded a certain level which prevents the VOIP calls from receiving their desired level of service. Hence, the controller set reconfigures branch edge node 924 to use previously deployed cloud gateway 910 in datacenter 920 for its VOIP calls, in order to reduce the load on the cloud gateway 805.

At 630, the path generator 525 in some embodiments provides its new next-hop forwarding records to just forwarding nodes that are members of the first set of forwarding nodes from which the statistics/metrics were collected. In other embodiments, however, the path generator 525 provides its new next-hop forwarding records to even the SD-WAN forwarding nodes from which the controller cluster did not collect statistics/metrics at 605. In other words, the first and second set of forwarding nodes are identical in some embodiments, while in other embodiments the first set of edge nodes is a subset of the second set of edge nodes (e.g., the second set includes at least one node not in the first edge).

For instance, in some embodiments, the controller cluster analyzes the metrics associated with the flows of one entity that relate to a SaaS provider's application (e.g., Office 365). After assessing that certain gateways are not meeting desired service level performance for the monitored flows of one entity, the controller cluster not only configures the edge nodes of that entity from reducing their usage, or altogether avoiding, the problematic gateways, but also configures the edge nodes of other entities in the same manner for the same SaaS provider application.

In some embodiments, the controller cluster collects statistics/metrics from only a subset of branches and datacenters of an entity, in order to conserve resources. However, in these embodiments, the controller cluster uses the knowledge that it derives by analyzing the collected data for configuring edge nodes and gateways for all the branches and datacenters of the entity that are part of the SD-WAN.

One of ordinary skill will realize that the above-described processes are performed differently in other embodiments. For instance, while FIG. 6 illustrates one set of operations that are performed periodically by the controller cluster, this cluster performs these operations at different frequencies in some embodiments. Also, instead of just adjusting next-hop forwarding records to adjust the paths for certain flows, the controller cluster distributes path-adjustment values to adjust how the edge nodes select among multiple viable paths to the same destinations, in order to reduce the load on particular gateways and/or to direct more of the flows through better performing gateways.

In different embodiments, the server set distributes different types of path adjustment values. In some embodiments, the distributed path adjustment values include path selection weight values for the edge nodes to use to select among different paths to the same destination (e.g., for flows associated with a particular application to the same destination edge node). In other embodiments, the distributed path adjustment values include packet processing statistics and/or other congestion metric associated with different gateways and/or different edge nodes. The source edge nodes in some embodiments use such statistics to select among different candidate gateways that are used by different candidate paths to the same destination, and/or to select among different candidate destination edge nodes when multiple different such nodes or destinations exist (e.g., when multiple candidate datacenters exist). In other embodiments, the server set uses still other types of path adjustment values.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
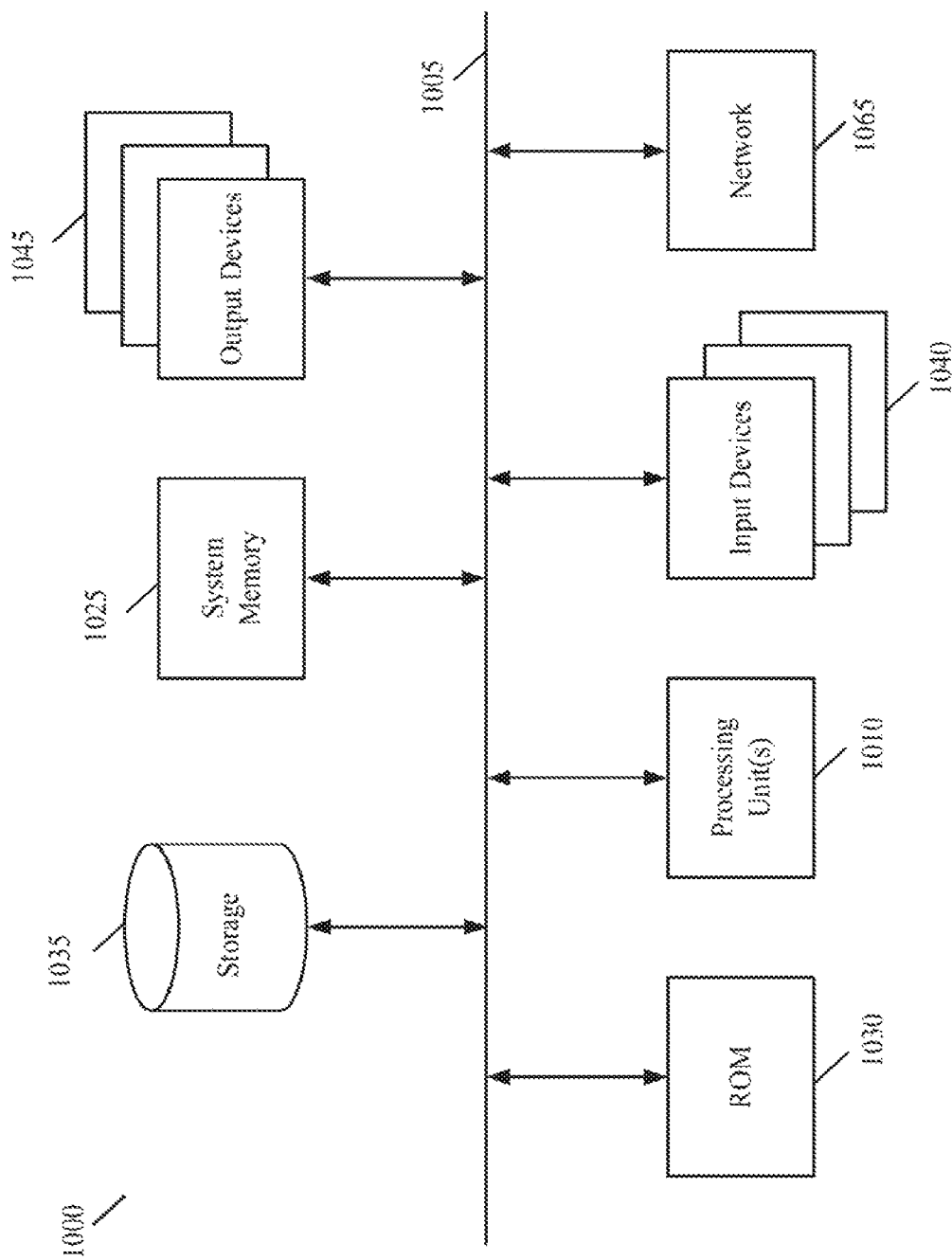
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device Like the permanent storage device 1035, the system memory 1025 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet), or a network of networks (such as the Internet). Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third party's private cloud datacenters (e.g., datacenters that the third party uses to deploy cloud gateways for different entities in order to deploy virtual networks for these entities). Thus, one of ordinary skill in the art would understand that the invention is not to be limited by the foregoing illustrative details, but rather is to be defined by the appended claims.

What is claimed is:

1. For an SD-WAN (software defined, wide area network) established by a plurality of edge nodes and a set of one or more cloud gateways, a method of using deep packet inspection (DPI) to control packet flows through the WAN, the method comprising:
    at a server,
        identifying, from sets of parameters collected for packet flows processed by a first set of two or more edge nodes for which DPI operations were performed, a subset of parameters associated with a plurality of flows relating to a particular application identifier specified by the DPI operations;
        analyzing the identified subset of parameters to identify at least one packet flow with an undesirable path through the WAN; and
        distributing adjusted forwarding records to a second set of one or more edge nodes to modify paths used by the second set of edge nodes for flows associated with the particular application identifier.

2. The method of claim 1, wherein at least a subset of the DPI operations is performed at the edge nodes.

3. The method of claim 1, wherein at least a subset of the DPI operations is performed at a physical location that is remote form physical locations at which the first set of edge nodes operate.

4. The method of claim 1, wherein the collected sets of parameters comprise operational metrics relating to a set of packet flows processed by the edge nodes.

5. The method of claim 4, wherein at least a set of the operational metrics are collected at the set of edge nodes.

6. The method of claim 4, wherein at least a set of the operational metrics are collected by at least one gateway.

7. The method of claim 1, wherein analyzing the identified subset of parameters comprises determining durations of time for packets in each of a plurality of packet flows to traverse from a source edge node of the flow through the WAN to reach a destination edge node of the flow.

8. The method of claim 1, wherein analyzing the identified subsets of parameters comprises determining durations of time for packets in each flow in a plurality of packet flows to traverse though a gateway to reach a destination edge node for the flow.

9. The method of claim 1, wherein
    a first node initially receives a first forwarding record and then receives a second forwarding record;
    based on the first forwarding record, the first node forwards a first packet flow through a first gateway before receiving the second forwarding record; and
    based on the second forwarding record, the first node stops forwarding the first packet flow through the first gateway and instead forwards the first packet flow through a second gateway.

10. The method of claim 1, wherein
    a first node initially receives a first forwarding record and then receives a second forwarding record;
    based on the first forwarding record, the first node uses a first gateway to forward a first packet flow associated with a first DPI parameter to a first destination of the first packet flow; and
    based on the second forwarding record, the first node uses a second gateway to forward a second packet flow associated with the first DPI parameter to a second destination of the second packet flow.

11. The method of claim 1, wherein the first and second destinations are the same destination.

12. The method of claim 1, wherein the first set of edge nodes is a subset of the second set of edge nodes.

13. The method of claim 12, wherein the second set of edge nodes includes at least one edge node not in the first set.

14. The method of claim 1 further comprising collecting parameters from the edge nodes in the first set, wherein the collected parameters comprise statistics collected by the edge nodes in the first set.

15. The method of claim 1 further comprising collecting parameters from a set of gateways, wherein the collected parameters comprise statistics collected by the gateways in the set.

16. The method of claim 1 further comprising:
    receiving, for each of a plurality of flow passing through the WAN, packets collected by the source and destination edge nodes and parameters associated with the collected packets.

17. The method of claim 16, wherein the collected packets comprise packets associated with a particular application identifier specified by DPI operations that were performed for the collected packets.

18. The method of claim 17, wherein the DPI operations are performed at both source and destination edge nodes.

19. The method of claim 17, wherein the DPI operations are performed at the source edge node and the application identifiers are provided by the source edge nodes to the destination edge nodes.

20. The method of claim 17, wherein the number of collected packets for a flow relate to number of packets needed for the DPI operation on the flow.

* * * * *